(12) United States Patent
Takafuji et al.

(10) Patent No.: US 6,882,916 B2
(45) Date of Patent: Apr. 19, 2005

(54) COLLISION OBJECT DISCRIMINATING APPARATUS INSTALLABLE ON A VEHICLE

(75) Inventors: Tetsuya Takafuji, Anjo (JP); Yoshiyuki Hattori, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/779,616

(22) Filed: Feb. 18, 2004

(65) Prior Publication Data

US 2004/0210367 A1 Oct. 21, 2004

(30) Foreign Application Priority Data

Apr. 15, 2003 (JP) ........................................ 2003-110510

(51) Int. Cl.⁷ .............................................. B60R 21/34
(52) U.S. Cl. ........................................ 701/45; 280/735
(58) Field of Search ............................ 701/45, 46, 47, 701/301; 180/268, 271, 274; 340/436; 280/728.1, 728.2, 735, 734, 805

(56) References Cited

U.S. PATENT DOCUMENTS

| | | | |
|---|---|---|---|
| 6,519,519 B1 * | 2/2003 | Stopczynski | 701/45 |
| 6,532,408 B1 * | 3/2003 | Breed | 701/45 |
| 6,644,688 B1 * | 11/2003 | Hu et al. | 280/735 |
| 6,728,613 B1 * | 4/2004 | Ishizaki et al. | 701/36 |
| 6,749,218 B1 * | 6/2004 | Breed | 280/735 |
| 6,757,611 B1 * | 6/2004 | Rao et al. | 701/301 |

FOREIGN PATENT DOCUMENTS

| | | |
|---|---|---|
| JP | 11-28994 | 2/1999 |
| JP | 11-194137 | 7/1999 |
| JP | 11-310095 | 11/1999 |

* cited by examiner

Primary Examiner—Richard M. Camby
(74) Attorney, Agent, or Firm—Posz Law Group, PLC

(57) ABSTRACT

A front surface side sensor is provided on a front surface of a bumper, and a reverse surface side sensor is provided on a reverse surface of the bumper. Accurately discriminating a pedestrian from other objects is feasible based on the combination of binary output levels of two sensors in case of vehicle collision, or based on ON time difference or the ON time duration of two sensors.

8 Claims, 15 Drawing Sheets

COLLISION OBJECT DISCRIMINATING APPARATUS INSTALLABLE ON A VEHICLE

BACKGROUND OF THE INVENTION

This invention relates to a vehicle collision object discriminating apparatus for discriminating a collision object having collided with a vehicle.

For example, as disclosed in the Japanese Patent Application Laid-open No. 11-310095, it is conventionally known to discriminate a collision object collided with a vehicle, especially whether or not the collision object is a pedestrian. According to this prior art document, a sensor for generating an output in accordance with a detected impact force is disposed to each of the front and rear sides of a bumper. A combination pattern of these sensor outputs is compared with pre-memorized data to judge the type of a collision object. Using this collision object judging technique makes it possible to prevent a pedestrian protecting device, such as a pedestrian protecting airbag, from erroneously operating in such a case that the collision object is not a pedestrian.

However, a variety of collision objects generally include stationary objects fixed on the ground, pedestrians, and lightweight non-stationary objects including signboards (hereinafter, also referred to as lightweight stationary objects or lightweight fallen objects). Furthermore, the stationary objects are roughly classified into heavyweight stationary objects including concrete walls and lightweight stationary objects including standing poles. Hence, accurately discriminating these objects by merely relying on the combination of output levels of two impact force detection sensors is very difficult. For example, relying only on the combination of output levels of two impact force detection sensors makes it very difficult to discriminate a pedestrian from road traffic signs or comparable lightweight stationary objects having a relatively light weight compared with other stationary objects.

Furthermore, to secure satisfactory discrimination accuracy, it is generally necessary to divide each output of two impact force detection sensors into multistage (at least four stages) levels. To this end, the impact force detection sensor is inevitably an analog output type sensor. Thus, in practical aspect, the impact force detection sensor is complicated in arrangement, expensive in cost, and insufficient in reliability and durability.

SUMMARY OF THE INVENTION

In view of the above-described problems, the present invention has an object to provide a vehicle collision object discriminating apparatus which is capable of accurately discriminating a pedestrian from other obstacles having various shapes and properties.

In order to accomplish the above and other related objects, the present invention provides a vehicle collision object discriminating apparatus including a front surface side sensor and a reverse surface side sensor which are respectively disposed at front and reverse sides of a cushioning member with respect to the collision direction of a vehicle body for generating an output signal representing an impact force entered when the vehicle body collides with a collision object, and a discriminating section for discriminating the type of the collision object based on output signals of the front and reverse surface side sensors, wherein the discriminating section discriminates the type of the collision object based on an ON duration time or an ON time difference as well as the combination of output levels of two sensors. The ON duration time represents a period of time during which at least one of two sensors continuously produces an ON-level output, while the ON time difference represents a period of time from ON-level output by one of two sensor to ON-level output by the other of two sensors.

With this arrangement, this invention makes it possible to discriminate the pedestrian from other various collision objects based on the combination of output levels of two sensors as well as the ON duration time or the ON time difference. Thus, the pedestrian can be adequately discriminated from lightweight fallen objects, lightweight stationary objects, and heavyweight stationary objects. As a result, the present invention provides a vehicle collision object discriminating apparatus which is, for example, capable of preventing a pedestrian protecting device from erroneously operating in case of vehicle collision against other objects.

According to a preferable embodiment of the present invention, the front and reverse surface side sensors are binary sensors each outputting a binary signal with reference to a predetermined threshold.

Namely, the present invention uses the above-described time data, such as the ON duration time or the ON time difference, for discrimination of the collision object. Thus, it becomes possible to use the sensors which generate a binary output level. These sensors can be extremely simplified in structure, improved in performance, and manufactured at low cost.

According to a preferable embodiment of the present invention, the front surface side sensor is fixed on a front surface of the cushioning member and the reverse surface side sensor is fixed on a reverse surface of the cushioning member. Hence, the fixing of two sensors is simple. In this case, one or both of two sensors can be integrated with or embedded in the cushioning member.

According to a preferable embodiment of the present invention, the discriminating section identifies the collision object with a pedestrian when the ON duration time is shorter than a predetermined ON duration time threshold and also when the reverse surface side sensor produces an ON-level output within a predetermined time after the front surface side sensor has produced an ON-level output under a condition that the front surface side sensor continuously produces the ON-level output.

Namely, according to this preferable embodiment, as later-explained in a first embodiment with reference to FIGS. 3 to 4 and Table 1, the pedestrian can be discriminated from lightweight objects (lightweight fallen objects) based on the combination of output levels of two sensors, and also discriminated from stationary objects based on the ON duration time. Thus, accurately discriminating the pedestrian is feasible.

According to a preferable embodiment of the present invention, the discriminating section identifies the collision object with a pedestrian when the ON time difference is longer than a predetermined ON time difference threshold. In this case, the ON time difference represents a period of time from ON-level output by the front surface side sensor to ON-level output by the reverse surface side sensor.

Namely, according to this preferable embodiment, as later-explained in a modified first embodiment with reference to FIGS. 9 and 10, the pedestrian can be discriminated from stationary objects by utilizing the large attenuation of a load waveform occurring in the cushioning member (e.g., bumper) in case of vehicle collision against the pedestrian. Quickly discriminating the pedestrian is feasible. Furthermore, the load waveform of the lightweight object (lightweight fallen object) is more greatly attenuated compared with that of the pedestrian. Considering this fact, it is possible to identify the collision object with the pedestrian when the ON time difference is within a predetermined range.

According to a preferable embodiment of the present invention, the discriminating section identifies the collision object with a pedestrian when the ON duration time is shorter than a predetermined ON duration time threshold and also when the reverse surface side sensor does not produce an ON-level output within a predetermined time after the front surface side sensor has produced an ON-level output under a condition that the front surface side sensor continuously produces the ON-level output.

Namely, according to this preferable embodiment, as later-explained in a second embodiment with reference to FIGS. 5 to 6 and Table 2, the lightweight object and the pedestrian can be discriminated from the heavyweight stationary object based on the combination of output levels of two sensors while the pedestrian can be discriminated from the lightweight stationary object based on the difference of the ON duration time. Thus, the pedestrian can be adequately discriminated from other lightweight objects, lightweight stationary objects, and heavyweight stationary objects. Furthermore, quickly discriminating the heavyweight stationary object is feasible.

According to a preferable embodiment of the present invention, the discriminating section identifies the collision object with a pedestrian when the ON duration time of the front surface side sensor is in a predetermined range between a first ON duration time threshold and a second ON duration time threshold and also when the reverse surface side sensor does not produces an ON-level output within a predetermined time after the front surface side sensor has produced an ON-level output under a condition that the front surface side sensor continuously produces the ON-level output.

Namely, according to this preferable embodiment, as later-explained in a third embodiment with reference to Table 3, the heavyweight stationary object can be discriminated from other objects based on the combination of output levels of two sensors while the pedestrian, the lightweight object, and the lightweight stationary object can be discriminated from each other based on the difference of ON duration time. Thus, the pedestrian can be adequately discriminated from other lightweight objects, lightweight stationary objects, and heavyweight stationary objects. Furthermore, quickly discriminating the heavyweight stationary object is feasible.

According to a preferable embodiment of the present invention, the discriminating section identifies the collision object with a pedestrian when the ON duration time is shorter than a predetermined ON duration time threshold and also when the reverse surface side sensor produces an ON-level output within a predetermined time after the front surface side sensor has produced an ON-level output under a condition that the front surface side sensor continuously produces the ON-level output.

Namely, according to this preferable embodiment, as later-explained in a fourth embodiment with reference to FIGS. 15 to 16 and Table 3, the lightweight object can be discriminated from other objects based on the combination of output levels of two sensors, while the pedestrian can be discriminated from the stationary object based on the difference of ON duration time. Thus, the pedestrian can be adequately discriminated from other lightweight objects and stationary objects.

According to a preferable embodiment of the present invention, the discriminating section selects, in response to entry of an input signal relating to a vehicle speed, the ON duration time threshold or the ON time difference threshold preferably applicable to the input signal relating to the vehicle speed with reference to a pre-memorized relationship between the vehicle speed and the ON duration time threshold or the ON time difference threshold.

Namely, according to this preferable embodiment, as later-explained in a fifth embodiment with reference to FIGS. 17 to 19, the above-described ON duration time or the ON time difference is changed in accordance with the vehicle speed. Thus, it becomes possible to accurately discriminate the pedestrian although the load entered into the sensor varies in accordance with the vehicle speed.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Hereinafter, vehicle collision object discriminating apparatus in accordance with preferred embodiments of the present invention will be explained with reference attached drawings.

First Embodiment

Explanation of Overall Arrangement

A vehicle collision object discriminating apparatus in accordance with a preferred embodiment of the present invention will be explained with reference to FIG. 1.

Figure 1:
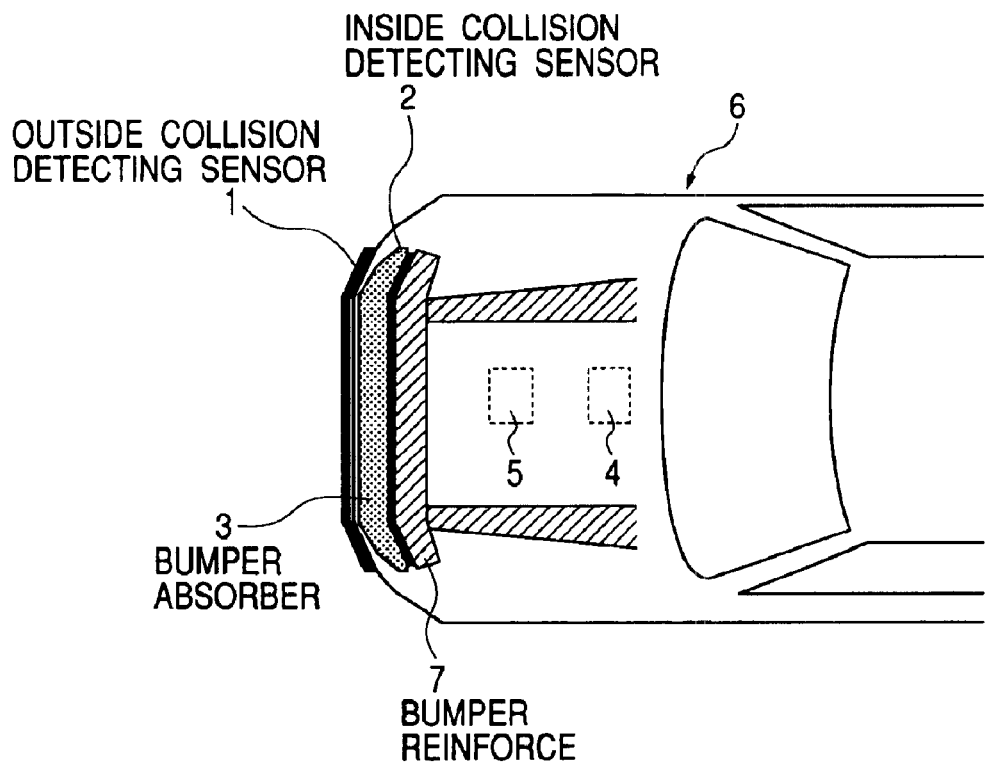
FIG. 1 is a plan view schematically showing a vehicle collision object discriminating apparatus in accordance with a preferred embodiment of the present invention.
Figure 2:
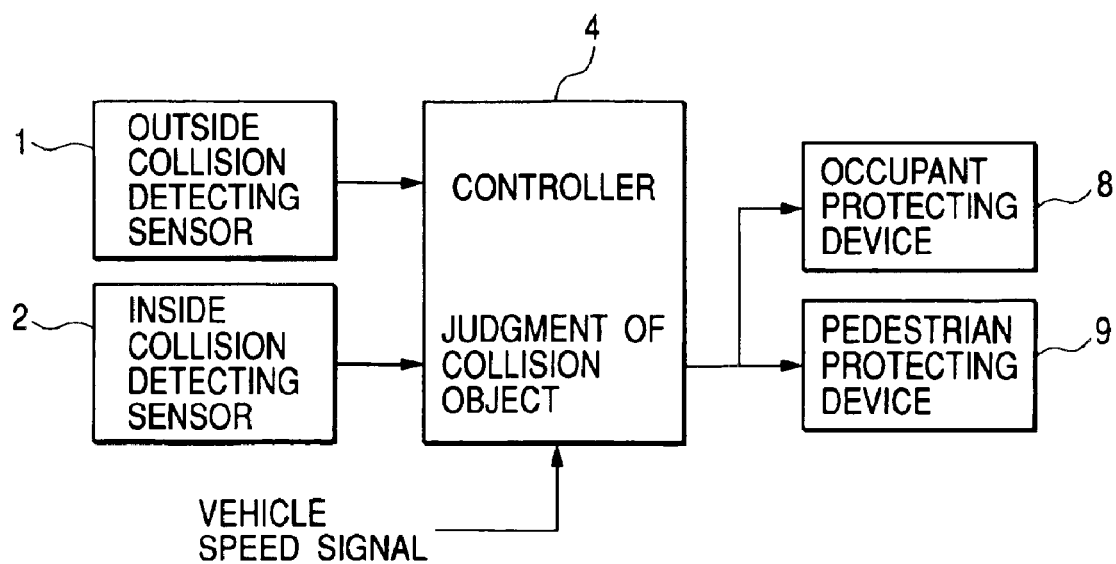
FIG. 2 is a block diagram showing the vehicle collision object discriminating apparatus shown in FIG. 1.

FIG. 1 shows an outside collision detecting sensor (i.e., a front surface side sensor of this invention) 1, an inside collision detecting sensor (i.e., a reverse surface side sensor of this invention) 2, a bumper absorber (i.e., cushioning member of this invention) 3, a controller (i.e., a discriminating section of this invention) 4, a vehicle speed sensor 5, and a vehicle body 6.

The inside collision detecting sensor 2 is provided on a reverse surface of the bumper absorber (hereinafter, referred also to as "bumper") 3 which extends in the right-and-left direction at the front surface side of a bumper reinforce 7. The bumper reinforce 7, located at a front part of the vehicle body 6, is a rigid member extending in the right-and-left direction to support the bumper 3 from behind. The outside collision detecting sensor 1 is provided on a front surface of the bumper absorber 3. Each of the outside collision detecting sensor 1 and the inside collision detecting sensor 2 extends in the right-and-left direction so as to substantially cover the entire width of the vehicle.

Each of the outside collision detecting sensor 1 and the inside collision detecting sensor 2 is preferably an impact force detection sensor which is capable of generating a binary signal as an electric signal, e.g., a signal voltage, representing the magnitude of a collision impact force generated in the collision of the vehicle and a collision object.

Regarding this kind of binary signal output-type impact force detection sensor, it is possible to adopt the sensor disclosed in Japanese Patent Application No. 2002-277908 filed by the assignee of this application. Alternatively, it is possible to select an adequate sensor from other types of switches, pressure sensors, and acceleration sensors. It is also possible to use a binary signal converted from an analog output signal produced from an analog impact force detection sensor.

Other possible ways will be a detecting method using a pressure sensor which detects internal pressure increase in a pressure tube extending along the bumper in the right-and-left direction and being compressed in case of collision; a detecting method using a load sensor attached on the bumper or an acceleration sensor which detects a load, i.e., a collision impact force or an acceleration; or a detecting method for detecting characteristics change of light in an optical fiber occurring due to deformation of an optical fiber when subjected to the pressure.

Furthermore, two sensors 1 and 2 can be constituted as a plurality of sensors aligned at predetermined pitches in the right-and-left direction. Alternatively, each of these sensors 1 and 2 can be constituted as a single sensor having an elongated body lying in the right-and-left direction. Furthermore, it is possible to arrange the inside collision detecting sensor 2 and the outside collision detecting sensor 1 so as to be positioned next to each other in the up-and-down direction. In short, it is definitely required that one of two sensors shows a damped or moderated response compared with the other in response to a reaction force against a collision impact force acting on the collision object.

The bumper absorber 3 is preferably made of polyurethane or a comparable material which can cause a plastic deformation for decentralizing the impact force and absorbing the impact force. It is however possible to use other material which causes an elastic deformation to bring the similar effects. The bumper absorber 3 has a function of decentralizing the collision impact force caused when the vehicle collides with a collision object, and damping this force (especially high-frequency components) and transmitting it rearward, thereby reducing the collision impact force acting on the inside collision detecting sensor 2.

Part of the rear surface of the bumper absorber 3 is brought into hermetical contact with the front surface of the inside collision detecting sensor 2. Preferably, the rest of the rear surface of the bumper absorber 3 (e.g., a portion overhanging on or under the inside collision detecting sensor 2) is, for example, brought into hermetical contact with the front surface of the bumper reinforce 7 or the like.

The controller 4 is a microcomputer-based control apparatus which executes predetermined calculations or operations based on predetermined input signals including the output signals of the outside collision detecting sensor 1 and the inside collision detecting sensor 2, making a judgment as to whether the source generating a collision impact force, i.e., the collision object, is a pedestrian or not, and activates a pedestrian protecting device 9 (e.g., a pedestrian protecting airbag, a hood popup device, or the like) when the judgment result reveals that the collision object is a pedestrian. Furthermore, it is preferable to activate an occupant protecting device 8 (e.g., an occupant protecting airbag or the like) when the magnitude of the collision impact force is large.

Type of Collision Object and Sensor Output Waveform

FIGS. 3 to 6 show waveforms of the load (impact force) acting on each of the outside collision detecting sensor 1 and the inside collision detecting sensor 2, obtained through experiments conducted by the inventors to simulate various types of vehicle collisions against a pedestrian, a lightweight object (also referred to as lightweight fallen object), a lightweight stationary object. Each of the outside collision detecting sensor 1 and the inside collision detecting sensor 2 produces a binary-level output signal based on the comparison between the input load and a threshold (referred to as ON load).

Figure 3:
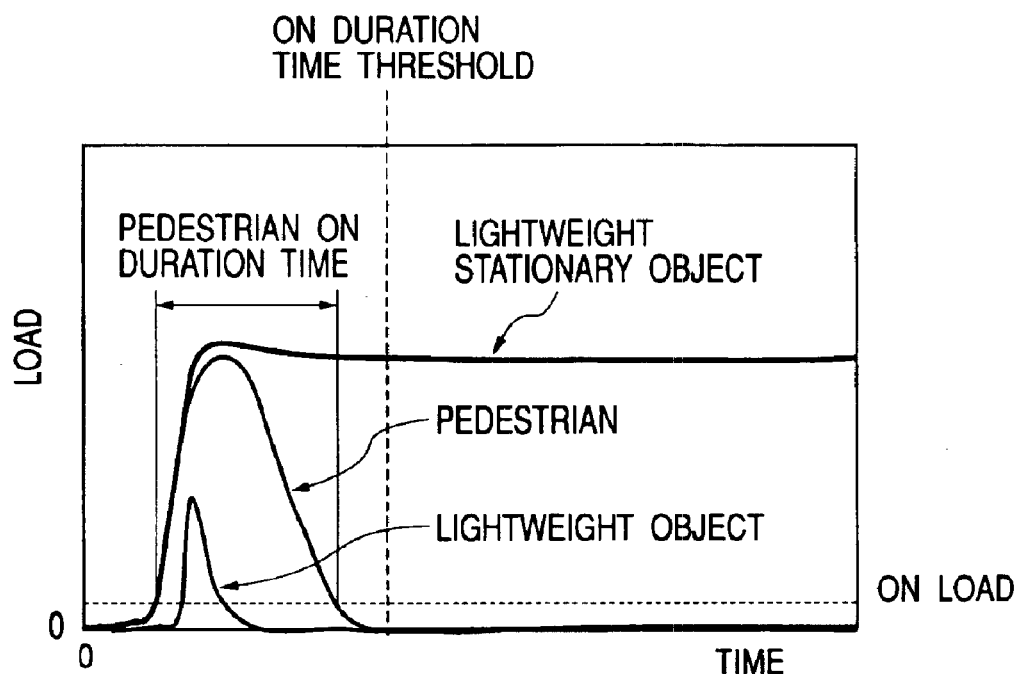
FIG. 3 is a graph showing the waveforms of various collision impact forces entered in an outside collision detecting sensor.
Figure 4:
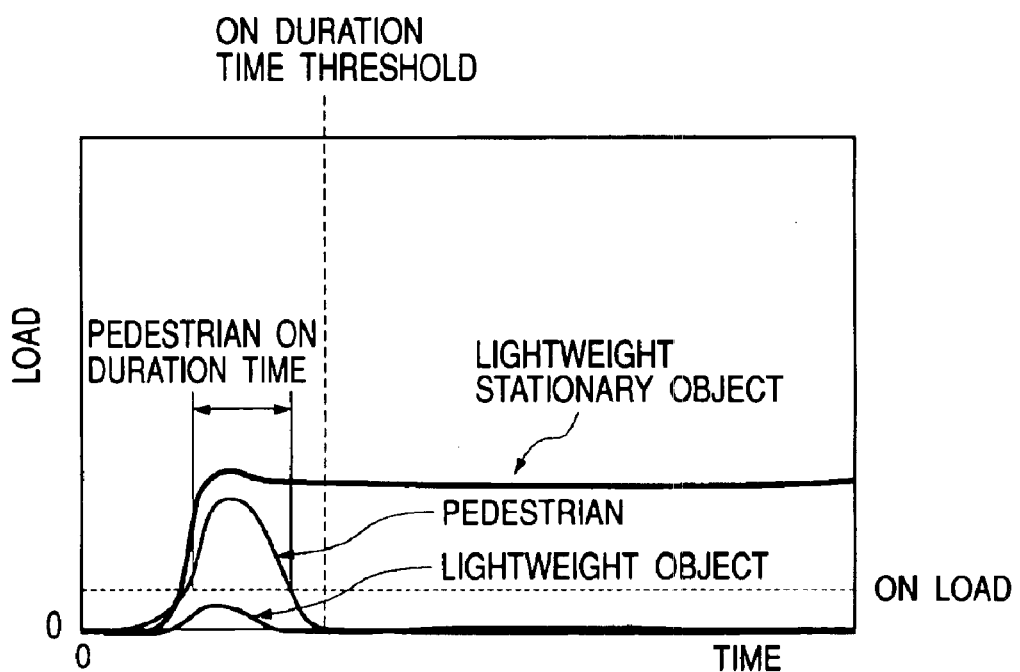
FIG. 4 is a graph showing the waveforms of various collision impact forces entered in an inside collision detecting sensor.
Figure 5:
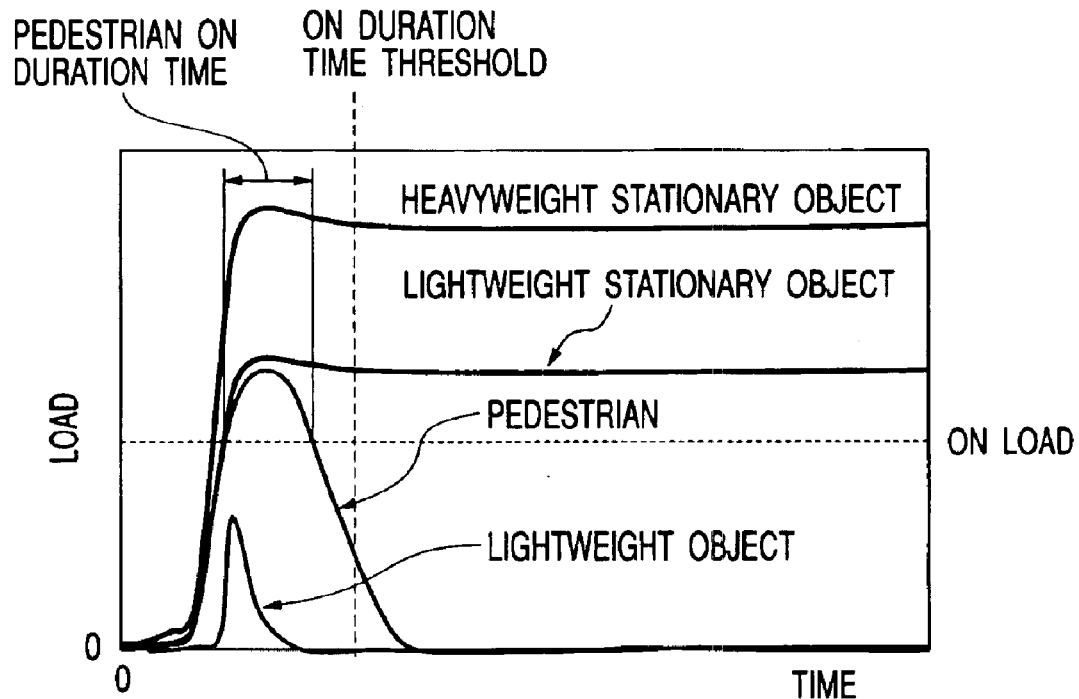
FIG. 5 is a graph showing the waveforms of various collision impact forces entered in the outside collision detecting sensor.
Figure 6:
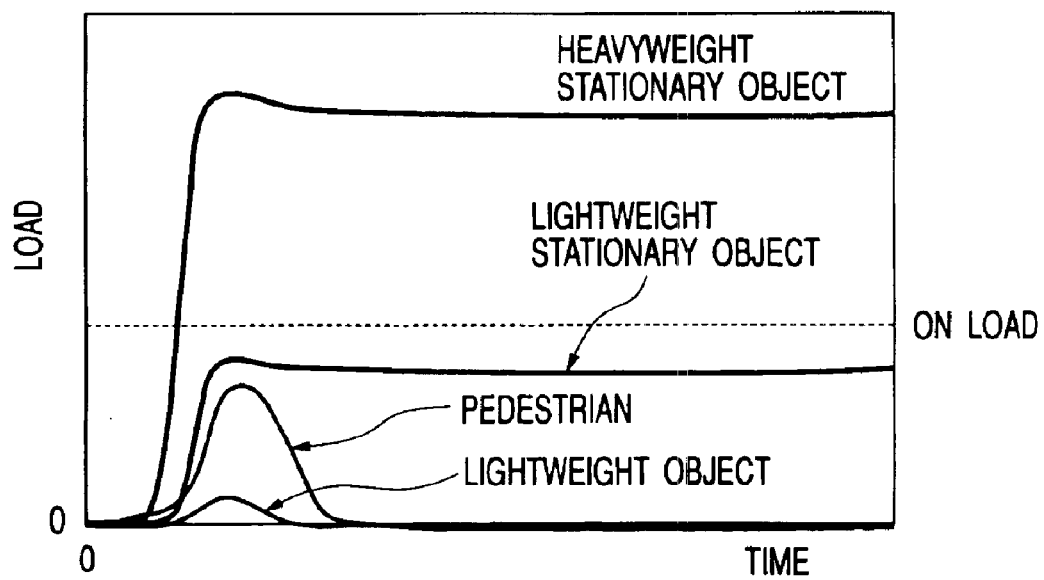
FIG. 6 is a graph showing the waveforms of various collision impact forces entered in the inside collision detecting sensor.

FIGS. 3 and 5 show the output waveforms of the outside collision detecting sensor 1, respectively. The waveforms shown in FIG. 3 represent the experimental result of the vehicle collision against the pedestrian, the lightweight object, and the lightweight stationary object, respectively. FIG. 5 further shows an additional waveform corresponding to the experimental result of the vehicle collision against the heavyweight stationary object. FIGS. 4 and 6 show the output waveforms of the inside collision detecting sensor 2, respectively. The waveforms shown in FIG. 4 represent the experimental result of the vehicle collision against the pedestrian, the lightweight object, and the lightweight stationary object. FIG. 6 further shows an additional waveform corresponding to the experimental result of the vehicle collision against the heavyweight stationary object.

Regarding the conditions of the experiments, FIG. 3 and FIG. 5 are different in the threshold (ON load) value used for the outside collision detecting sensor 1. The ON load used in the experiment of FIG. 3 is set to a lower level so that the sensor 1 can generate an ON signal even in the case of vehicle collision against the lightweight object. On the other hand, the ON load used in the experiment of FIG. 5 is set to a higher level so that the sensor 1 cannot generate an ON signal only in the case of vehicle collision against the lightweight object. Similarly, FIG. 4 and FIG. 6 are different in the threshold (ON load) value used for the inside collision detecting sensor 2. The ON load used in the experiment of FIG. 4 is set to a lower level so that the sensor 2 cannot generate an ON signal only in the case of vehicle collision against the lightweight object. On the other hand, the ON load used in the experiment of FIG. 6 is set to a higher level so that the sensor 2 can generate an ON signal only in the case of vehicle collision against the heavyweight stationary object. Meanwhile, each of the outside collision detecting sensor 1 and the inside collision detecting sensor 2 can generate an analog output in accordance with an input load. In this case, the analog output should be converted into a binary signal with a comparator or the like. It is also desirable that each of the sensors 1 and 2 is constituted as a binary sensor having a threshold corresponding to the above-described ON load.

The lightweight objects include movable or shiftable objects, such as signboards. The lightweight stationary objects, such as road traffic signs, are generally fixed on the ground and have a relatively light weight. The heavyweight stationary objects include concrete walls. In these drawings, the pedestrian ON duration time (also referred to as "ON duration time") is defined as a period of time during which both of the sensors 1 and 2 produce the ON signal in the case of vehicle collision against the pedestrian. Furthermore, the ON duration time threshold is a predetermined threshold time being set to be later by a predetermined time than an estimated termination of the ON duration time in the case that these sensors 1 and 2 have once produced the ON signals. The outside collision detecting sensor 1 used in the measurement of FIGS. 3 and 5 and the inside collision detecting sensor 2 used in the measurement of FIGS. 4 and 6 have the same output characteristics.

As understood from FIGS. 3 and 4, each load of the lightweight object, the pedestrian, and the lightweight stationary object entered into the inside collision detecting sensor 2 is damped and delayed by the bumper and is accordingly greatly reduced to a smaller level when it is entered into the outside collision detecting sensor 1. Especially, as understood from the collision waveform of the lightweight object, the bumper is capable of greatly damping high-frequency components of the load. However, as understood from FIGS. 5 and 6, the impact force damping and delaying effect of the bumper cannot be obtained in the case of vehicle collision against a block wall or other heavyweight stationary object. Hence, the output of outside collision detecting sensor 1 is substantially the same in waveform with the output of inside collision detecting sensor 2.

1.1. Discrimination of Pedestrian

Appropriate setting of the ON load in FIGS. 3 and 4 makes it possible to discriminate the lightweight object (i.e., lightweight fallen object) from others based on the combination of the output levels of two sensors 1 and 2. More specifically, when the inside collision detecting sensor 2 does not produce an ON signal within a predetermined time (being set considering the transmission delay in the bumper) after the outside collision detecting sensor 1 has produced the ON signal, it can be concluded that the vehicle has collided with the lightweight object.

However, according to the settings of ON load shown in FIGS. 3 and 4, it is impossible to discriminate the lightweight stationary object from the pedestrian. The settings of ON load shown in FIGS. 5 and 6 cannot discriminate the lightweight stationary object from the pedestrian, too. Namely, in the vehicle collision against the pedestrian, the output peaks of two sensors 1 and 2 are almost identical. However, as understood from the comparison between FIG. 3 and FIG. 4, the pedestrian and the lightweight stationary object are greatly different in the ON duration time. The ON duration time of the pedestrian is remarkably short. From this fact, it is meaningful to make a judgment as to whether or not at least one or both of the ON duration times of two sensors 1 and 2 are less than a predetermined ON duration time threshold. When judged as being lower than this ON duration time threshold, it can be concluded that the vehicle has collided with the pedestrian. Thus, the pedestrian, the lightweight stationary object, and the heavyweight stationary object are discriminable from each other. Hereinafter, for the purpose of simplification, the lightweight stationary object and the heavyweight stationary object are collectively referred to as stationary object.

Figure 7:
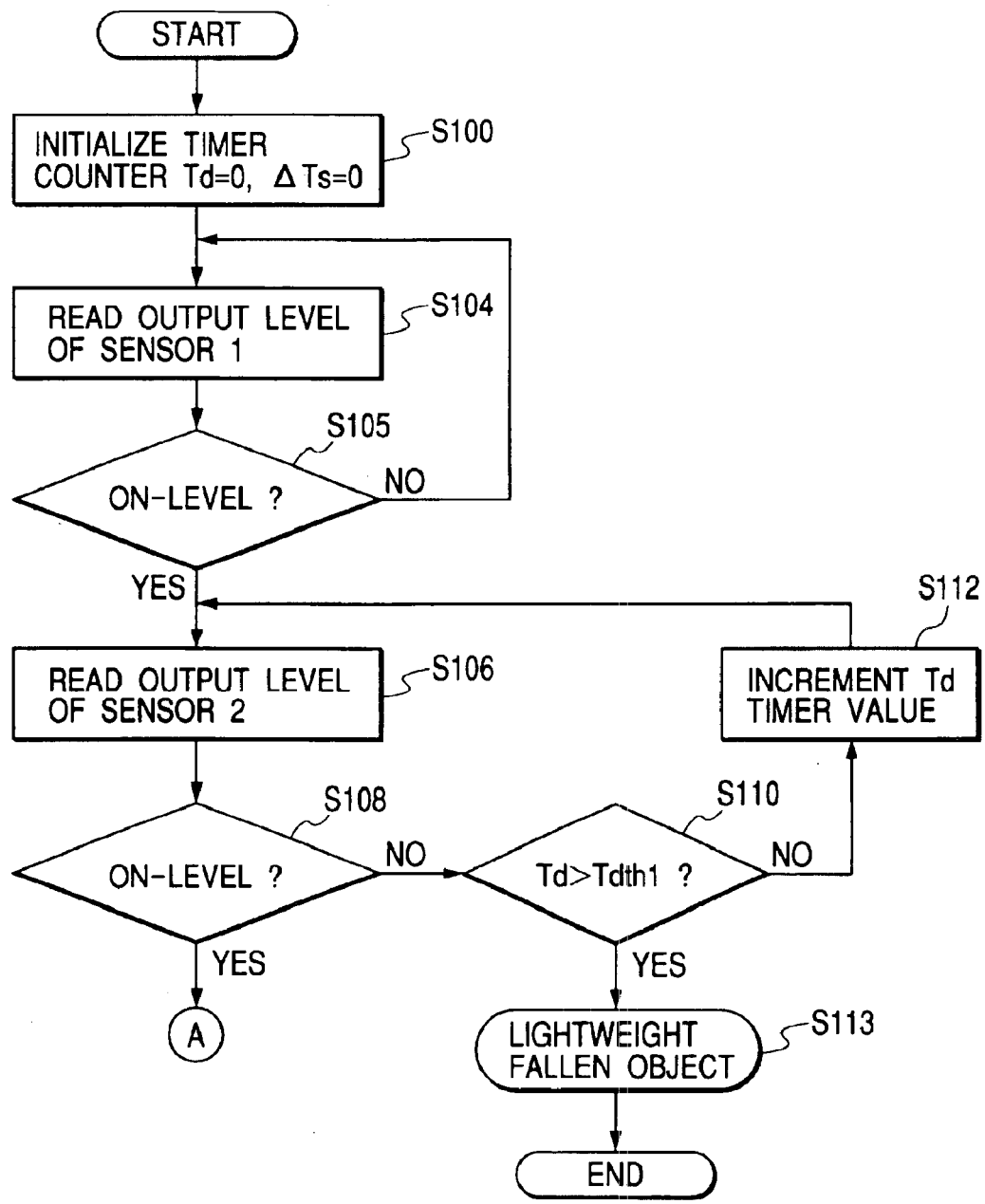
FIG. 7 is a flowchart showing the collision object discriminating processing in accordance with a first embodiment of the present invention.
Figure 8:
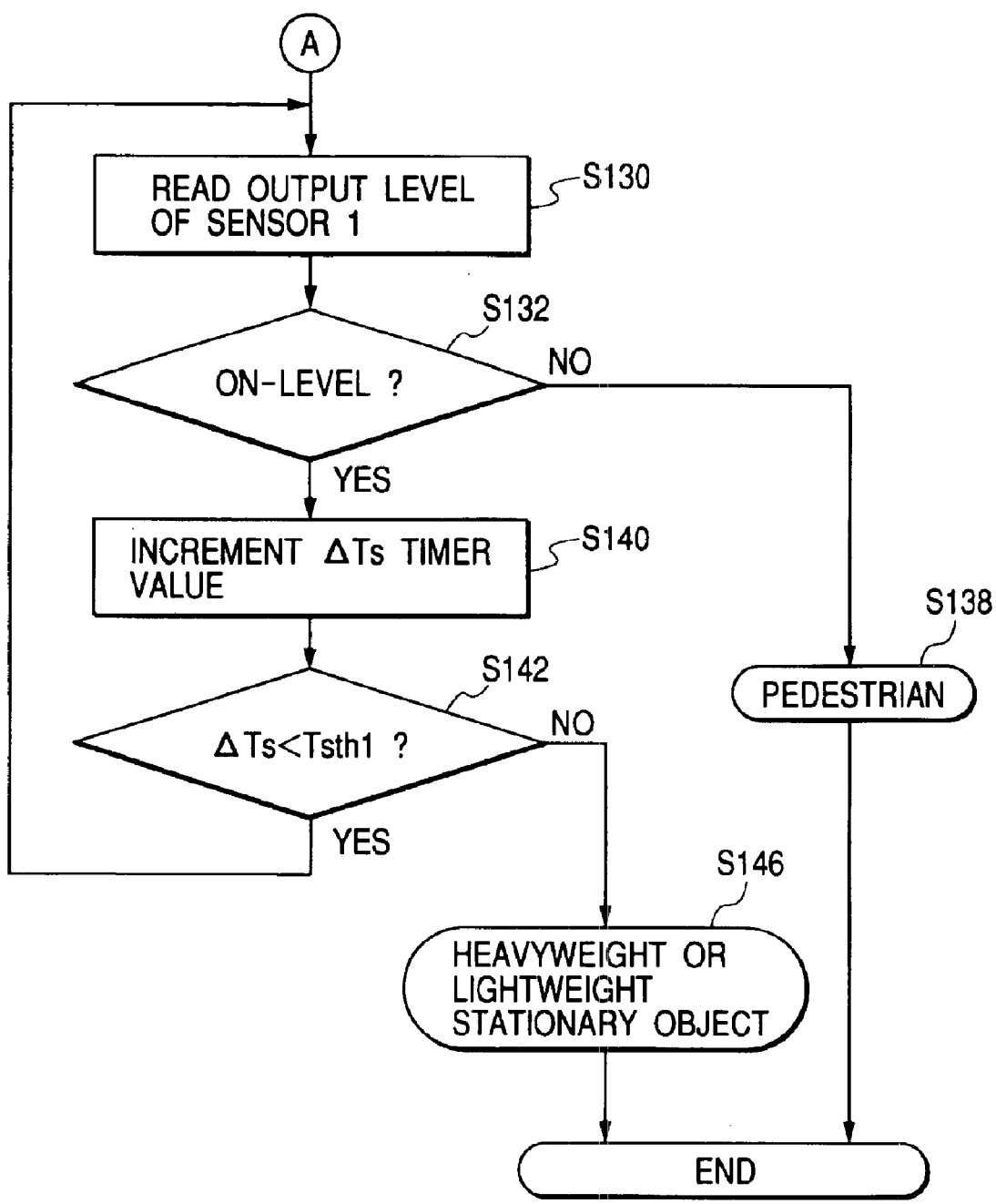
FIG. 8 is a flowchart showing the rest of the collision object discriminating processing in accordance with the first embodiment of the present invention.

As a whole, it is understood that appropriate combination of the output levels of two sensors 1 and 2 makes it possible to discriminate the pedestrian from the lightweight object, while discriminating the pedestrian from the stationary object is feasible based on the ON duration times of two sensors 1 and 2. In other words, the combination of the output levels of two sensors 1 and 2 and their ON duration times are essentially required to accurately discriminate the pedestrian from other collision bodies. FIGS. 7 and 8 are flowcharts cooperatively showing the pedestrian discriminating processing of the first embodiment executed by the controller 4. Table 1 shows judgment conditions used in this pedestrian discriminating processing.

Figure 9:
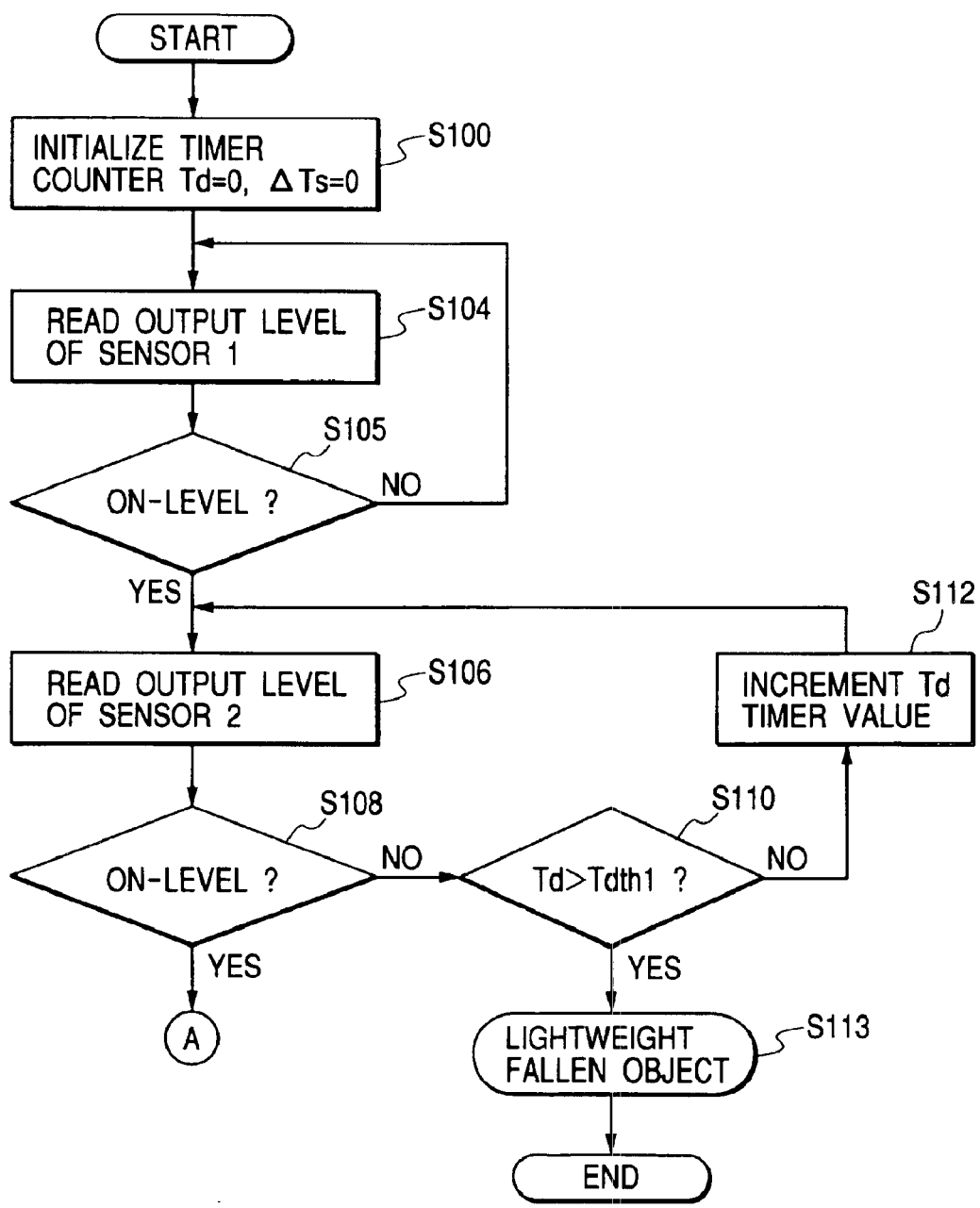
FIG. 9 is a flowchart showing the modified collision object discriminating processing in accordance with the first embodiment of the present invention.
Figure 10:
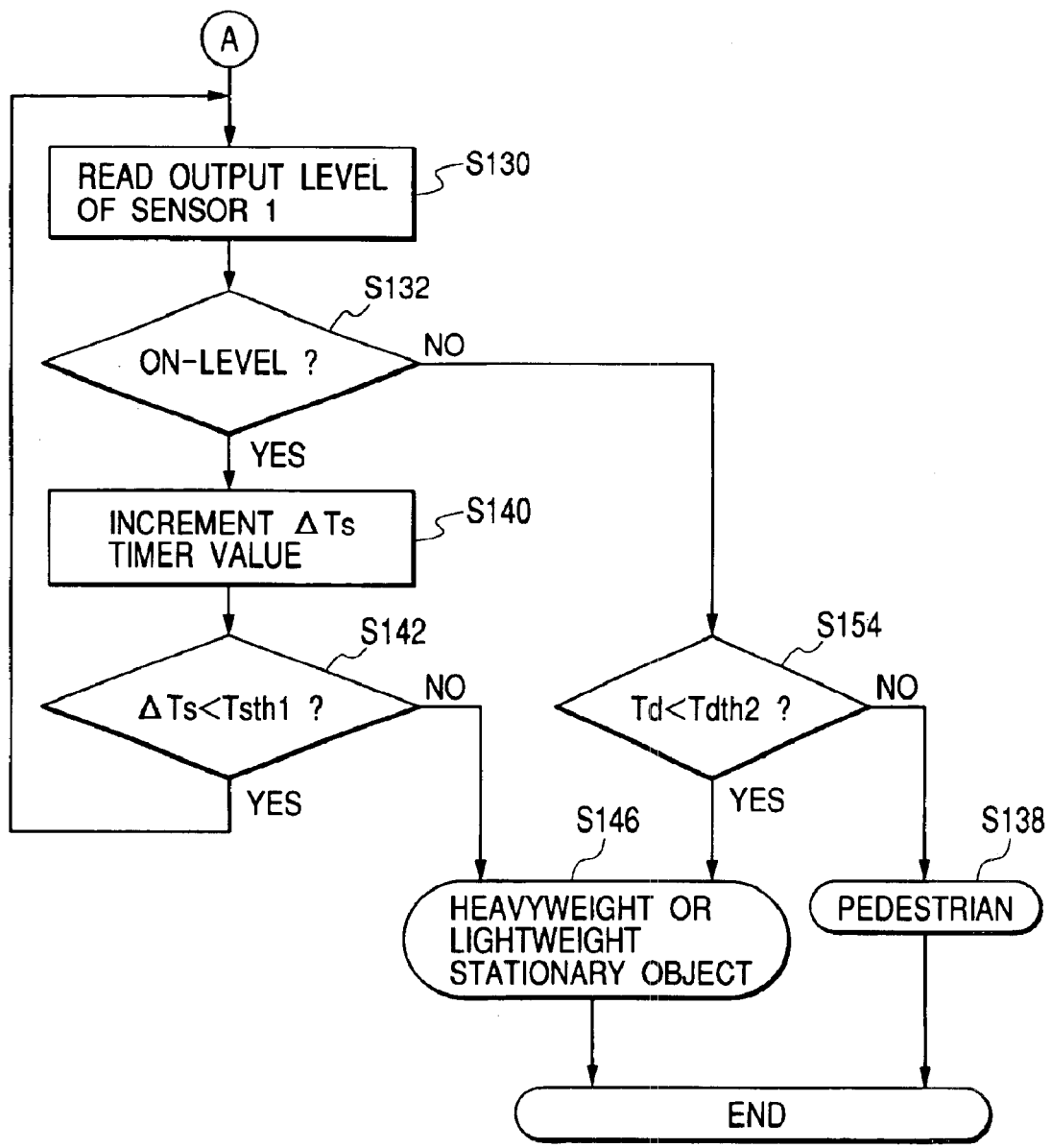
FIG. 10 is a flowchart showing the rest of the modified collision object discriminating processing in accordance with the first embodiment of the present invention.

In Table 1, $\Delta Ts$ represents an ON duration time timer value used for measuring the ON duration time of outside collision detecting sensor 1, $\Delta Tsth1$ represents an ON duration time threshold of outside collision detecting sensor 1, ΔTb represents an ON duration time of inside collision detecting sensor 2, and ΔTbth 1 represents an ON duration time threshold of inside collision detecting sensor 2. FIGS. 9 and 10 are flowcharts cooperatively showing modified pedestrian discriminating processing of the first embodiment executed by the controller 4.

TABLE 1

| | ON/OFF combination | | ON duration time ΔT | |
|---|---|---|---|---|
| | Sensor 1 | Sensor 2 | Sensor 1 | Sensor 2 |
| Lightweight fallen object | ON | OFF | — | — |
| Pedestrian | | ON | ΔTs < Tsth1 | ΔTb < Tbth1 |
| Lightweight stationary object | | | Tsth1 ≤ ΔTs | Tbth1 ≤ ΔTb |
| Heavyweight stationary object | | | | |

1.2. Discriminating Method According to First Embodiment

With reference to the flowchart shown in FIGS. 7 and 8, the discriminating method in accordance with the first embodiment will be explained. Td represents an ON time difference timer value used for measuring a period of time from ON timing of the outside collision detecting sensor (i.e., front surface side sensor) 1 to ON timing of the inside collision detecting sensor (i.e., reverse surface side sensor) 2. ΔTs represents the ON duration time timer value used for measuring an ON duration time of the outside collision detecting sensor 1. Tsth1 represents a pedestrian ON duration time threshold. Tdth1 represents an ON time difference threshold which is a threshold time used for judging the OFF (i.e., not turning into ON) operation of the inside collision detecting sensor 2.

After the discriminating processing is started, an ON time difference counting timer and an ON duration time counting timer and are both reset, i.e., Td=0 and ΔTs=0 (at the step S100). An output level of the outside collision detecting sensor 1 is read (at the step S104). It is checked whether or not the output level of the sensor 1 exceeds the ON load (at the step S105). When the output level did not exceed the ON load (i.e., NO in the step S105), the processing of step S104 is executed again. When the output level exceeded the ON load (i.e., YES in the step S105), an output level of the inside collision detecting sensor 2 is read (S106). Then, it is checked whether or not the output level of the sensor 2 exceeds the ON load (at the step S108). When the output level of the sensor 2 did not exceed the ON load (i.e., NO in the step S108), it is then checked whether or not the ON time difference timer value Td exceeds the ON time difference threshold Tdth1 (at the step S110). When the ON time difference timer value Td did not exceed the ON time difference threshold Tdth1 (i.e., NO in the step S110), the ON time difference timer value Td is incremented (at the step S112) and the control flow returns to the step S106. When the ON time difference timer value Td exceeded the ON time difference threshold Tdth1 (i.e., YES in the step S110), it is judged that the inside collision detecting sensor 2 does not produce the ON-level output, and the collision object is identified with the lightweight object (at the step S113). Then, this routine is terminated.

Next, when the output level of the inside collision detecting sensor 2 exceeds the ON load (i.e., YES in the step S108), the control flow proceeds to the step S130. In the case that the control flow repetitively circulated the steps S106, S108, S110, and S112 to identify the lightweight object in the step S113, the period of time equal to Tdth1 has completely passed.

However, when the output level of the inside collision detecting sensor 2 turned into the ON-level before the period of time equal to Tdth1 has passed, there is the possibility that the collision object may be a pedestrian, as understood from the combination of sensor output levels shown in Table 1.

In the step S130, the output of the outside collision detecting sensor 1 is read again. In other words, the ON duration time of the outside collision detecting sensor 2 is measured and checked through the following processing.

Namely, in the step S132, it is checked whether or not the outside collision detecting sensor 1 is in the ON condition. When the outside collision detecting sensor 1 is in the ON condition (i.e., YES in the step S132), the ON duration time timer value ΔTs is incremented (at the step S140). Then, it is checked whether or not the ON duration time timer value ΔTs is less than the pedestrian ON duration time threshold Tsth1 (at the step S142). When the ON duration time timer value ΔTs is less than the pedestrian ON duration time threshold Tsth1 (i.e., YES in the step S142), the control flow returns to the step S130 to repeat the above-described processing. As described above, the stationary object has the longer ON duration time compared with the pedestrian. Thus, when the ON duration time timer value ΔTs is equal to or larger than the pedestrian ON duration time threshold Tsth1 (i.e., NO in the step S142), the collision object is identified with the stationary object (at the step S146) and this routine is terminated.

Meanwhile, in the case of vehicle collision against the pedestrian, the output level of outside collision detecting sensor 1 soon turns into an OFF condition. Thus, when the outside collision detecting sensor 1 turns into the OFF condition (i.e., NO in the step S132), the collision object is identified with the pedestrian (at the step S138). And then, this routine is terminated.

As described above, the ON duration time of the pedestrian is remarkably shorter than that of the stationary object. Thus, in case of vehicle collision against the pedestrian, the outside collision detecting sensor 1 turns into OFF condition before the ON duration time timer value ΔTs reaches the pedestrian ON duration time threshold Tsth1. In other words, the control flow repetitively circulates the steps S130, S132, S140, and S142 and finally identifies the collision object with the pedestrian at the step S138.

Thus, according to the vehicle collision object discriminating apparatus of the first embodiment of the present invention, the discriminating section (4) identifies the collision object with a pedestrian when the ON duration time is shorter than the predetermined ON duration time threshold (Tsth1) and also when the reverse surface side sensor (2) produces an ON-level output within a predetermined time (Tdth1) after the front surface side sensor (1) has produced an ON-level output under the condition that the front surface side sensor (1) continuously produces the ON-level output.

1.2.1. Modified Discriminating Method According to First Embodiment

The flowchart shown in FIGS. 9 and 10 is different from that shown in FIGS. 7 and 8 in that a step S154 is newly added. In the newly added step S154, it is checked whether or not the ON time difference timer value Td is less than an ON time difference threshold Tdth2. As described above, the ON time difference represents a period of time from ON timing of the outside collision detecting sensor 1 to ON timing of the inside collision detecting sensor 2. The ON time difference threshold Tdth2 is a threshold used for judging the length of the ON time difference. When the ON time difference timer value Td is less than the ON time difference threshold Tdth2 (i.e., YES in step S154), the collision object is identified with the stationary object (at the step S146). When the ON time difference timer value Td is equal to or larger than the ON time difference threshold Tdth2 (i.e., NO in step S154), the collision object is identified with the pedestrian in the step S138.

Thus, according to the modified vehicle collision object discriminating apparatus of the first embodiment of the present invention, wherein the discriminating section (4) identifies the collision object with a pedestrian when the ON time difference is longer than a predetermined ON time difference threshold (Tdth2).

Second Embodiment

Other method for discriminating the pedestrian will be explained hereinafter.

2.1. Discrimination of Pedestrian

As understood from FIGS. 5 and 6, when the ON load is set to a higher level, it becomes possible to accurately discriminate the pedestrian according to a discrimination method different from that explained in the first embodiment. More specifically, the pedestrian and the lightweight object (i.e., lightweight fallen object) are discriminable based on the output levels of two sensors 1 and 2. When the outside collision detecting sensor 1 produced an ON signal, it is concluded that the collision object is not the lightweight object. Furthermore, when the inside collision detecting sensor 2 produced an ON-level output within a predetermined time (being set considering the delay in the bumper) after the outside collision detecting sensor 1 has produced an ON-level output, the collision object can be identified with the heavyweight stationary object. In other words, when the outside collision detecting sensor 1 produces an ON signal and the inside collision detecting sensor 2 produces an OFF signal, it is concluded that the collision object is the pedestrian or the lightweight object (i.e., lightweight fallen object).

Furthermore, when the pedestrian is compared with the stationary object (i.e., the lightweight stationary object or the heavyweight stationary object), the pedestrian is greatly different from the stationary object in the ON duration time of the outside collision detecting sensor 1. The ON duration time of the pedestrian is remarkably short. Accordingly, it is effective to check whether or not the ON duration time of the outside collision detecting sensor 1 is less than a predetermined ON duration time threshold. When the ON duration time of the sensor 1 is less than the predetermined ON duration time threshold, the collision object is identified with the pedestrian. Thus, the pedestrian can be discriminated from the lightweight stationary object or the heavyweight stationary object.

Figure 11:
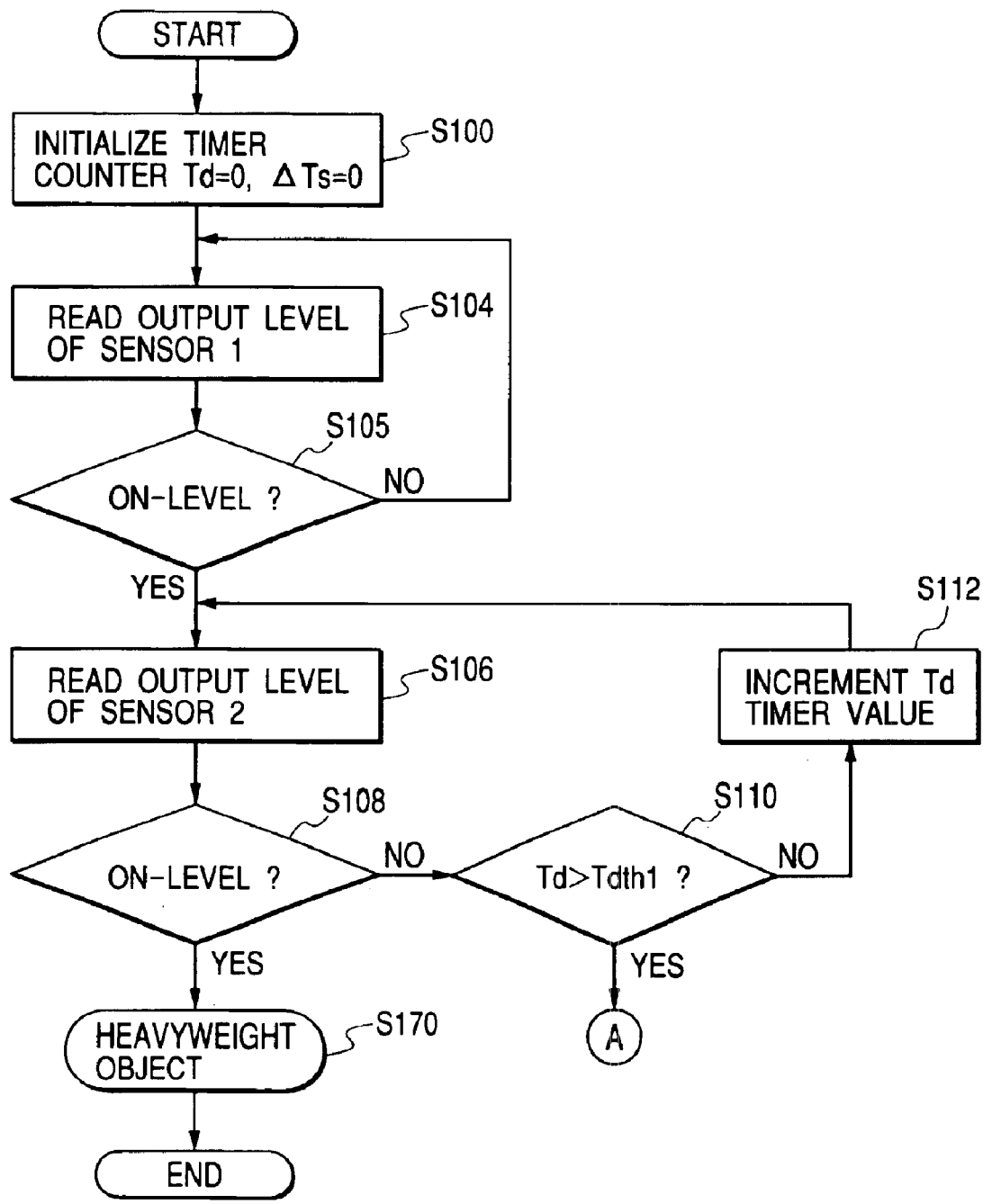
FIG. 11 is a flowchart showing the collision object discriminating processing in accordance with a second embodiment of the present invention.
Figure 12:
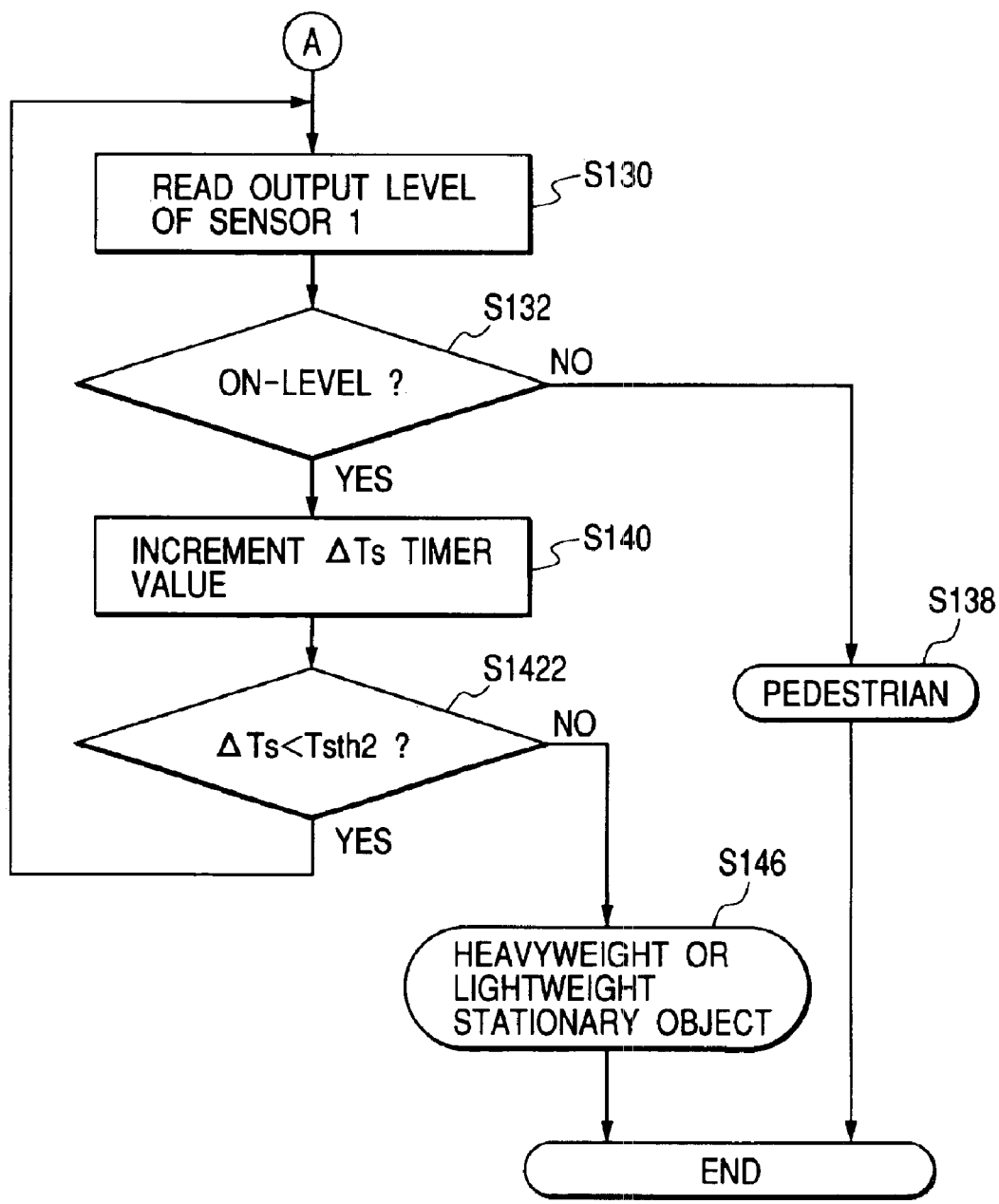
FIG. 12 is a flowchart showing the rest of the collision object discriminating processing in accordance with the second embodiment of the present invention.

Namely, the above-described discrimination method can not only discriminate the pedestrian from the lightweight object (i.e., lightweight fallen object), the lightweight stationary object, and the heavyweight stationary object but also identify only the heavyweight stationary object. This makes it possible to command a specific protection control so as to be activated only against the heavyweight stationary object. FIGS. 11 and 12 are flowcharts cooperatively showing the pedestrian discriminating processing of the second embodiment executed by the controller 4. Table 2 shows judgment conditions used in this pedestrian discriminating processing.

TABLE 2

|  | ON/OFF combination | | ON duration time $\Delta T$ | |
|---|---|---|---|---|
|  | Sensor 1 | Sensor 2 | Sensor 1 | Sensor 2 |
| Lightweight fallen object | OFF | OFF | — | — |
| Pedestrian Lightweight stationary object | ON |  | $\Delta Ts < Tsth2$ $Tsh2 \leq \Delta Ts$ | — — |
| Heavyweight stationary object |  | ON | — | — |

2.2. Discriminating Method According to Second Embodiment

With reference to the flowchart shown in FIGS. 11 and 12, the discriminating method in accordance with the second embodiment will be explained. In this flowchart, Tsth2 represents a pedestrian ON duration time threshold used in the second embodiment. The rest of the setting values shown in FIGS. 11 and 12 are identical with those shown in FIGS. 7 and 8.

More specifically, the flowchart shown in FIGS. 11 and 12 is different from the flowchart shown in FIGS. 7 and 8 in that, when the inside collision detection sensor 2 is in the ON condition in the step S108, the collision object is identified with the heavyweight stationary object (at the step S170) and the routine is terminated. Meanwhile, when the ON time difference timer value Td exceeded the threshold Tdth1 (i.e., YES in the step S110), the control flow proceeds to the step S130. In other words, when the output level of the inside collision detecting sensor 2 did not turn into the ON-level until the period of time equal to Tdth1 has passed, there is the possibility that the collision object may be a pedestrian, as understood from the combination of sensor output levels shown in Table 2.

In the step S130, the output of the outside collision detecting sensor 1 is read again to measure and check the ON duration time of the outside collision detection sensor 1. Namely, in the step S132, it is checked whether or not the outside collision detecting sensor 1 is in the ON condition. When the outside collision detecting sensor 1 is in the ON condition (i.e., YES in the step S132), the ON duration time timer value $\Delta Ts$ is incremented (at the step S140). Then, it is checked whether or not the ON duration time timer value $\Delta Ts$ is less than the pedestrian ON duration time threshold Tsth2 (at the step S1422). When the ON duration time timer value $\Delta Ts$ is less than the pedestrian ON duration time threshold Tsth2 (i.e., YES in the step S1422), the control flow returns to the step S130 to repeat the above-described processing. As described above, the stationary object has the longer ON duration time compared with the pedestrian. Thus, when the ON duration time timer value $\Delta Ts$ is equal to or larger than the pedestrian ON duration time threshold Tsth2 (i.e., NO in the step S1422), the collision object is identified with the stationary object (at the step S146) and this routine is terminated.

Meanwhile, in the case of vehicle collision against the pedestrian, the output level of outside collision detecting sensor 1 soon turns into an OFF condition. Thus, when the outside collision detecting sensor 1 turns into the OFF condition (i.e., NO in the step S132), the collision object is identified with the pedestrian (at the step S138). And then, this routine is terminated.

As described above, the ON duration time of the pedestrian is remarkably shorter than that of the lightweight or heavyweight stationary object. Thus, in case of vehicle collision against the pedestrian, the outside collision detecting sensor 1 turns into OFF condition before the ON duration time timer value ΔTs reaches the pedestrian ON duration time threshold Tsth2. In other words, the control flow repetitively circulates the steps S130, S132, S140, and S142 and finally identifies the collision object with the pedestrian at the step S138.

Thus, according to the vehicle collision object discriminating apparatus in accordance with the second embodiment of the present invention, the discriminating section (4) identifies the collision object with a pedestrian when the ON duration time is shorter than a predetermined ON duration time threshold (Tsth2) and also when the reverse surface side sensor (2) does not produce an ON-level output within a predetermined time (Tdth1) after the front surface side sensor (1) has produced an ON-level output under a condition that the front surface side sensor (1) continuously produces the ON-level output.

Third Embodiment

Other method for discriminating the pedestrian will be explained hereinafter.

3.1. Discrimination of Pedestrian

This pedestrian discriminating method of this embodiment is carried out based on FIG. 3 and FIG. 6.

From the relationship shown in FIG. 3 and FIG. 6, it is understood that the heavyweight stationary object can be discriminated from other objects based on the combination of output levels of two sensors 1 and 2. Furthermore, when the pedestrian ON duration time is equal to or larger than the ON duration time threshold shown in FIG. 3, the lightweight stationary object can be discriminated from the pedestrian and the lightweight object (i.e., lightweight fallen object).

Figure 13:
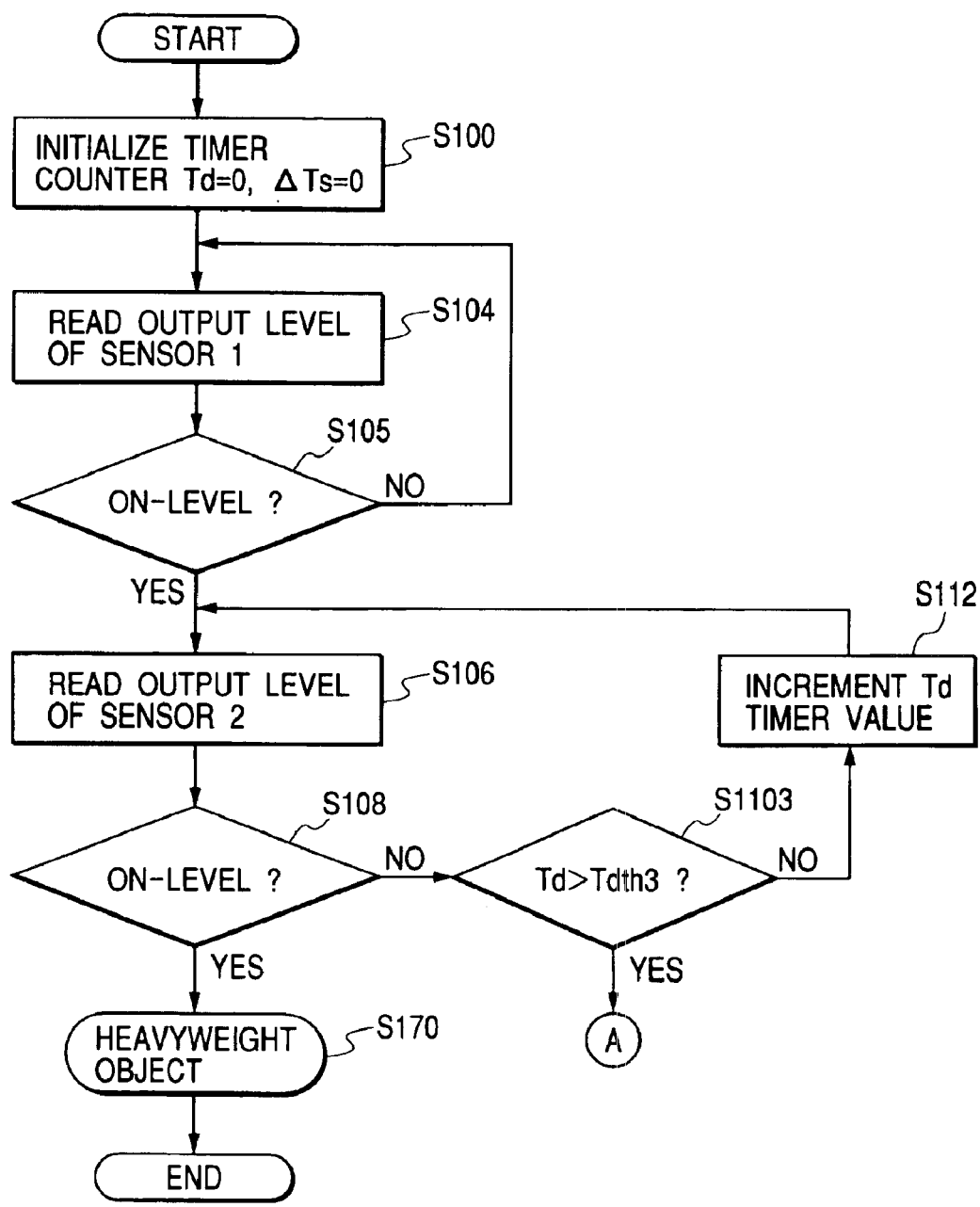
FIG. 13 is a flowchart showing the collision object discriminating processing in accordance with a third embodiment of the present invention.
Figure 14:
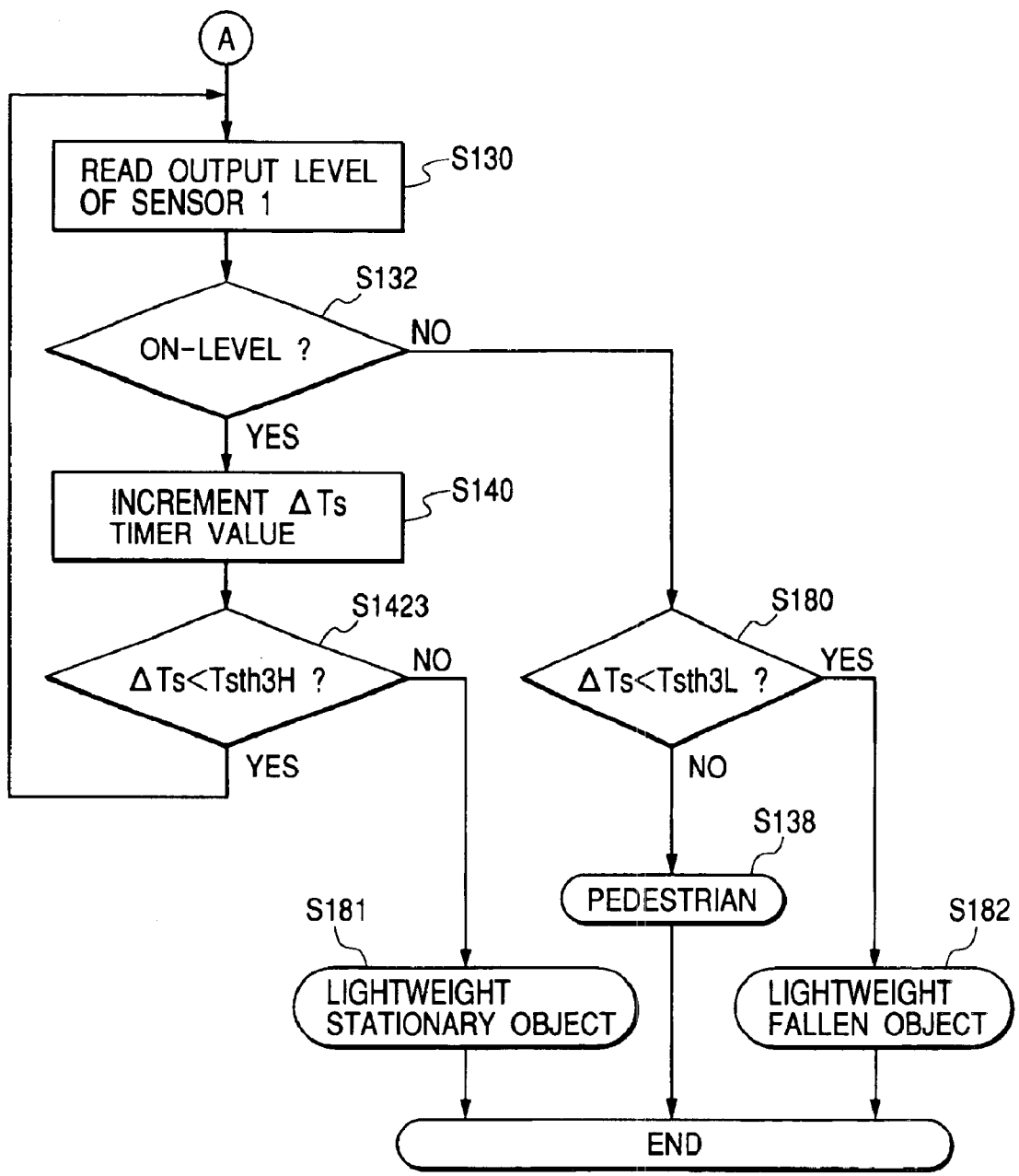
FIG. 14 is a flowchart showing the rest of the collision object discriminating processing in accordance with the third embodiment of the present invention.

In this case, the pedestrian cannot be discriminated from the lightweight object. It is however possible to set an auxiliary ON duration time threshold intervening between two waveforms of the pedestrian and the lightweight object. When the ON duration time is equal to or less than the auxiliary ON duration time threshold, the collision body is identified with the lightweight object. FIGS. 13 and 14 are flowcharts cooperatively showing the pedestrian discriminating processing of the third embodiment executed by the controller 4.

TABLE 3

| | ON/OFF combination | | ON duration time ΔT | |
|---|---|---|---|---|
| | Sensor 1 | Sensor 2 | Sensor 1 | Sensor 2 |
| Lightweight fallen object | ON | OFF | ΔTs < Tsth3L | — |
| Pedestrian | | | Tsth3L ≦ ΔTs ≦ Tsth3H | — |
| Lightweight stationary object | | | Tsth3H ≦ ΔTs | — |
| Heavyweight stationary object | | ON | — | — |

3.2. Discriminating Method According to Third Embodiment

FIGS. 13 and 14 cooperatively show the discriminating method in accordance with the third embodiment of the present invention. A first threshold Tsth3H represents the pedestrian ON duration time threshold used in a later-described step S1423 of the third embodiment. A second threshold Tsth3L represents the auxiliary pedestrian ON duration time threshold used in a later-descried step S180 of the third embodiment. The first threshold Tsth3H is larger than the second second threshold Tsth3L. Meanwhile, Tdth3 represents an ON time difference threshold used in the third embodiment which is a threshold time used for judging the OFF (i.e., not turning into ON) operation of the inside collision detecting sensor 2. The rest of the setting values shown in FIGS. 13 and 14 are identical with those shown in FIGS. 7 and 8.

More specifically, the flowchart shown in FIGS. 13 and 14 is different from the flowchart shown in FIGS. 7 and 8 in that, when the inside collision detection sensor 2 is in the ON condition in the step S108, the collision object is identified with the heavyweight stationary object (at the step S170) and the routine is terminated. Meanwhile, when the ON time difference timer value Td exceeded the threshold Tdth3 (i.e., YES in the step S1103), the control flow proceeds to the step S130. In other words, when the output level of the inside collision detecting sensor 2 did not turn into the ON-level until the period of time equal to Tdth3 has passed, there is the possibility that the collision object may be a pedestrian, as understood from the combination of sensor output levels shown in Table 3.

In the step S130, the output of the outside collision detecting sensor 1 is read again to measure and check the ON duration time of the outside collision detecting sensor 1. Then, in the step S132, it is checked whether or not the outside collision detecting sensor 1 is in the ON condition. When the outside collision detecting sensor 1 is in the ON condition (i.e., YES in the step S132), the ON duration time timer value ΔTs is incremented (at the step S140). Then, it is checked whether or not the ON duration time timer value ΔTs is less than the pedestrian ON duration time threshold Tsth3H (at the step S1423). When the ON duration time timer value ΔTs is less than the pedestrian ON duration time threshold Tsth3H (i.e., YES in the step S1423), the control flow returns to the step S130 to repeat the above-described processing. As described above, the lightweight stationary object has the longer ON duration time compared with the pedestrian. Thus, when the ON duration time timer value ΔTs is equal to or larger than the pedestrian ON duration time threshold Tsth3H (i.e., NO in the step S1423), the collision object is identified with the lightweight stationary object (at the step S181) and this routine is terminated.

Furthermore, when the outside collision detecting sensor 1 is in the OFF condition (i.e., NO in the step S132), the control flow proceeds to a step newly added step S180. In this step S180, it is checked whether or not the ON duration time timer value ΔTs is less than the auxiliary pedestrian ON duration time Tsth3L. When the ON duration time timer value ΔTs is less than the auxiliary pedestrian ON duration time Tsth3L (i.e., YES in step S180), the collision object is identified with the lightweight object (at the step S182). On the other hand, when the ON duration time timer value ΔTs is equal to or larger than the auxiliary pedestrian ON duration time Tsth3L (i.e., NO in step S180), the collision object is identified with the pedestrian (at the step S138). Then, this routine is terminated.

Thus, according to the vehicle collision object discriminating apparatus in accordance with the third embodiment of the present invention, the discriminating section (4) identifies the collision object with a pedestrian when the ON duration time of the front surface side sensor (1) is in a predetermined range between a first ON duration time threshold (Tsth3H) and a second ON duration time threshold (Tsth3L) and also when the reverse surface side sensor (2) does not produces an ON-level output within a predetermined time (Tdth3) after said front surface side sensor (1) has produced an ON-level output under a condition that said front surface side sensor (1) continuously produces the ON-level output.

Fourth Embodiment

Other method for discriminating the pedestrian will be explained hereinafter.

4.1. Discrimination of Pedestrian

This pedestrian discriminating method of this embodiment is carried out based on FIG. 4 and FIG. 5.

From the relationship shown in FIG. 4 and FIG. 5, it is understood that the lightweight object can be discriminated from other objects based on the combination of output levels of two sensors 1 and 2. Namely, two sensors 1 and 2 produce the OFF-level output in case of the vehicle collision against the lightweight object. In other words, two sensors 1 and 2 produce the ON-level output in case of the vehicle collision against other objects.

Figure 15:
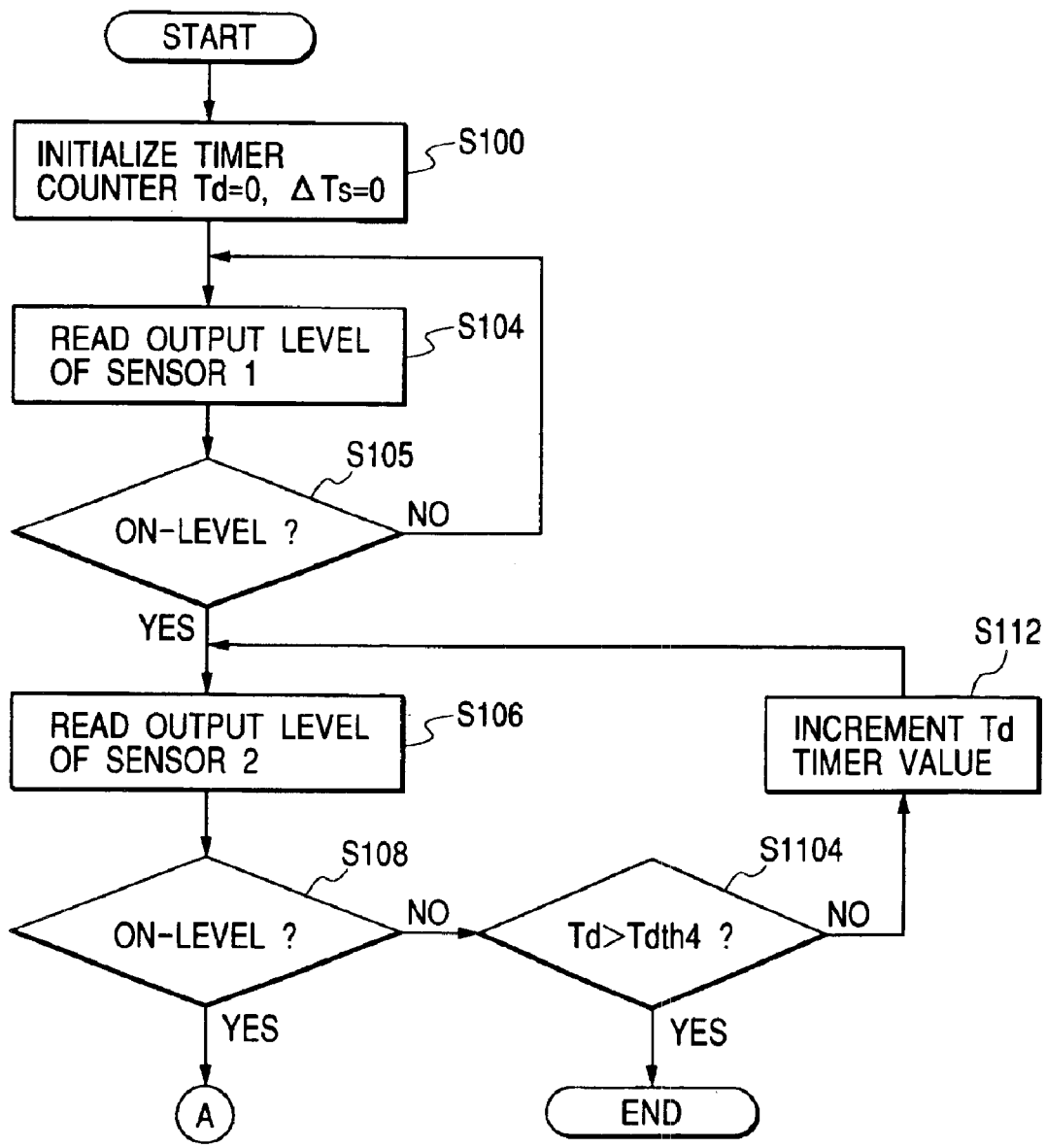
FIG. 15 is a flowchart showing the collision object discriminating processing in accordance with a fourth embodiment of the present invention.
Figure 16:
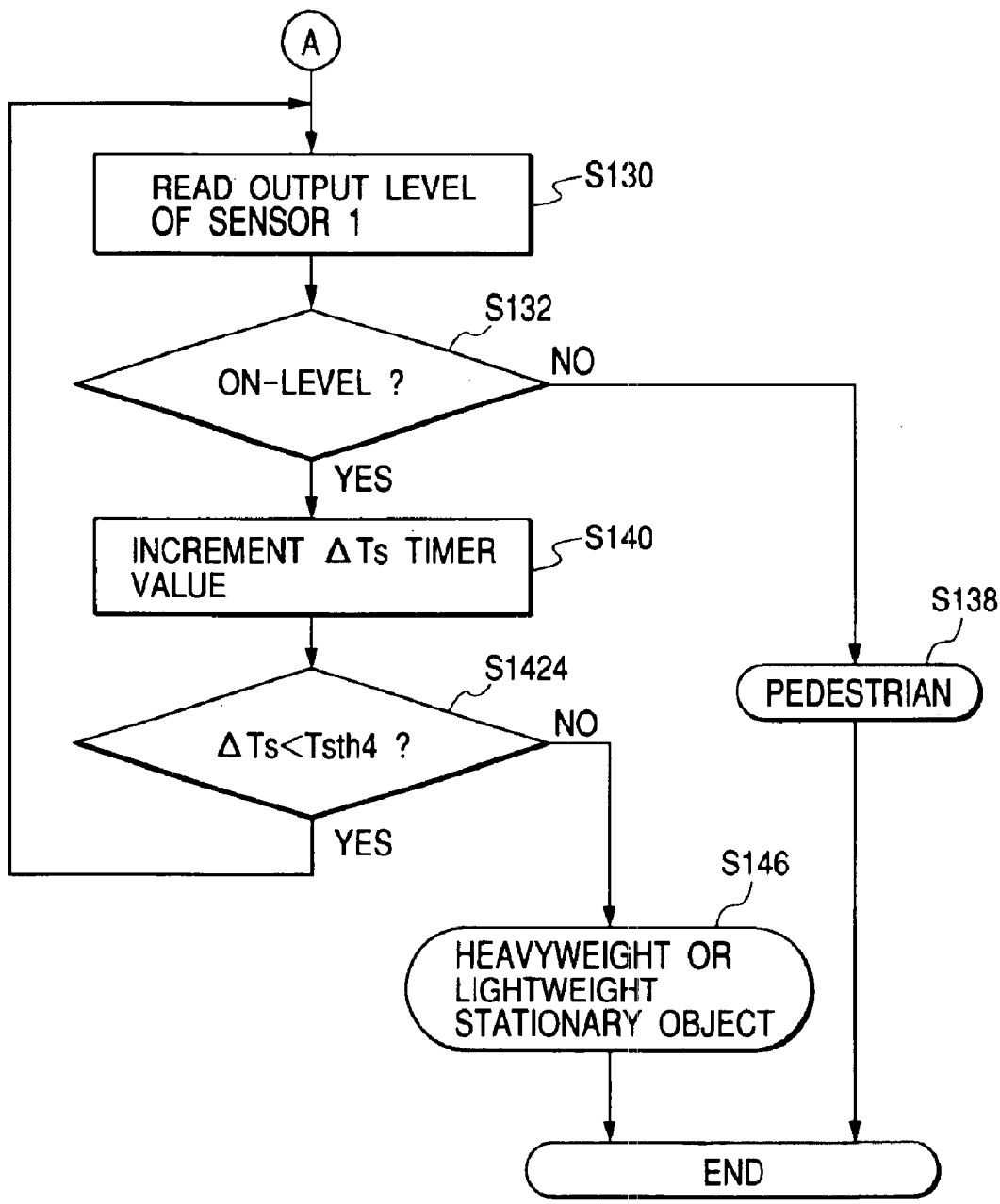
FIG. 16 is a flowchart showing the rest of the collision object discriminating processing in accordance with the fourth embodiment of the present invention.

Furthermore, when the pedestrian ON duration time is equal to or less than the ON duration time threshold shown in FIG. 4 or FIG. 5 in either one or both of two sensors 1 and 2, the pedestrian can be discriminated from the lightweight stationary object and the heavyweight stationary object. FIGS. 15 and 16 are flowcharts cooperatively showing the pedestrian discriminating processing of the fourth embodiment executed by the controller 4. Table 4 shows judgment conditions used in this pedestrian discriminating processing. In table 4, $\Delta$Tsth4 represents an ON duration time threshold of outside collision detecting sensor 1 used in a later-described step S1423 of the fourth embodiment, and $\Delta$Tbth4 represents an ON duration time threshold of inside collision detecting sensor 2.

TABLE 4

| | ON/OFF combination | | ON duration time $\Delta$T | |
|---|---|---|---|---|
| | Sensor 1 | Sensor 2 | Sensor 1 | Sensor 2 |
| Lightweight fallen object | OFF | OFF | — | — |
| Pedestrian | ON | ON | Ts < Tsth4 | $\Delta$Tb < Tbth4 |
| Lightweight stationary object | | | Tsth4 $\leq$ $\Delta$Ts | Tbth4 $\leq$ $\Delta$Tb |
| Heavyweight stationary object | | | — | — |

4.2. Discriminating Method According to Fourth Embodiment

According to this embodiment, when the ON time difference timer value Td exceeded the ON time difference threshold Tdth4 (i.e., YES in the step S1104), this routine is terminated without identifying any object.

Furthermore, when the output level of the inside collision detecting sensor 2 exceeds the ON load (i.e., YES in the step S108), the control flow proceeds to the step S130. In other words, when the output level of the inside collision detecting sensor 2 turned into the ON-level before the period of time equal to Tdth4 has passed, there is the possibility that the collision object may be a pedestrian, as understood from the combination of sensor output levels shown in Table 4.

In the step S130, the output of the outside collision detecting sensor 1 is read again to measure and check the ON duration time of outside collision detecting sensor 1. Next, in the step S132, it is checked whether or not the outside collision detecting sensor 1 is in the ON condition. When the outside collision detecting sensor 1 is in the ON condition (i.e., YES in the step S132), the ON duration time timer value $\Delta$Ts is incremented (at the step S140). Then, it is checked whether or not the ON duration time timer value $\Delta$Ts is less than the pedestrian ON duration time threshold Tsth4 (at the step S1424). When the ON duration time timer value $\Delta$Ts is less than the pedestrian ON duration time threshold Tsth4 (i.e., YES in the step S1424), the control flow returns to the step S130 to repeat the above-described processing. As described above, the stationary object has the longer ON duration time compared with the pedestrian. Thus, when the ON duration time timer value $\Delta$Ts is equal to or larger than the pedestrian ON duration time threshold Tsth4 (i.e., NO in the step S1424), the collision object is identified with the stationary object (at the step S146) and this routine is terminated.

Meanwhile, in the case of vehicle collision against the pedestrian, the output level of outside collision detecting sensor 1 soon turns into an OFF condition. Thus, when the outside collision detecting sensor 1 turns into the OFF condition (i.e., NO in the step S132), the collision object is identified with the pedestrian (at the step S138). And then, this routine is terminated.

As described above, the ON duration time of the pedestrian is remarkably shorter than that of the lightweight stationary object. Thus, in case of vehicle collision against the pedestrian, the outside collision detecting sensor 1 turns into OFF condition before the ON duration time timer value $\Delta$Ts reaches the pedestrian ON duration time threshold Tsth4. In other words, the control flow repetitively circulates the steps S130, S132, S140, and S142 and finally identifies the collision object with the pedestrian at the step S138.

Thus, according to the vehicle collision object discriminating apparatus of the fourth embodiment of the present invention, the discriminating section (4) identifies the collision object with a pedestrian when the ON duration time is shorter than the predetermined ON duration time threshold (Tsth4) and also when the reverse surface side sensor (2) produces an ON-level output within a predetermined time (Tdth4) after the front surface side sensor (1) has produced an ON-level output under the condition that the front surface side sensor (1) continuously produces the ON-level output.

Fifth Embodiment

Other method for discriminating the pedestrian will be explained hereinafter.

5.1. Discrimination of Pedestrian

Figure 17:
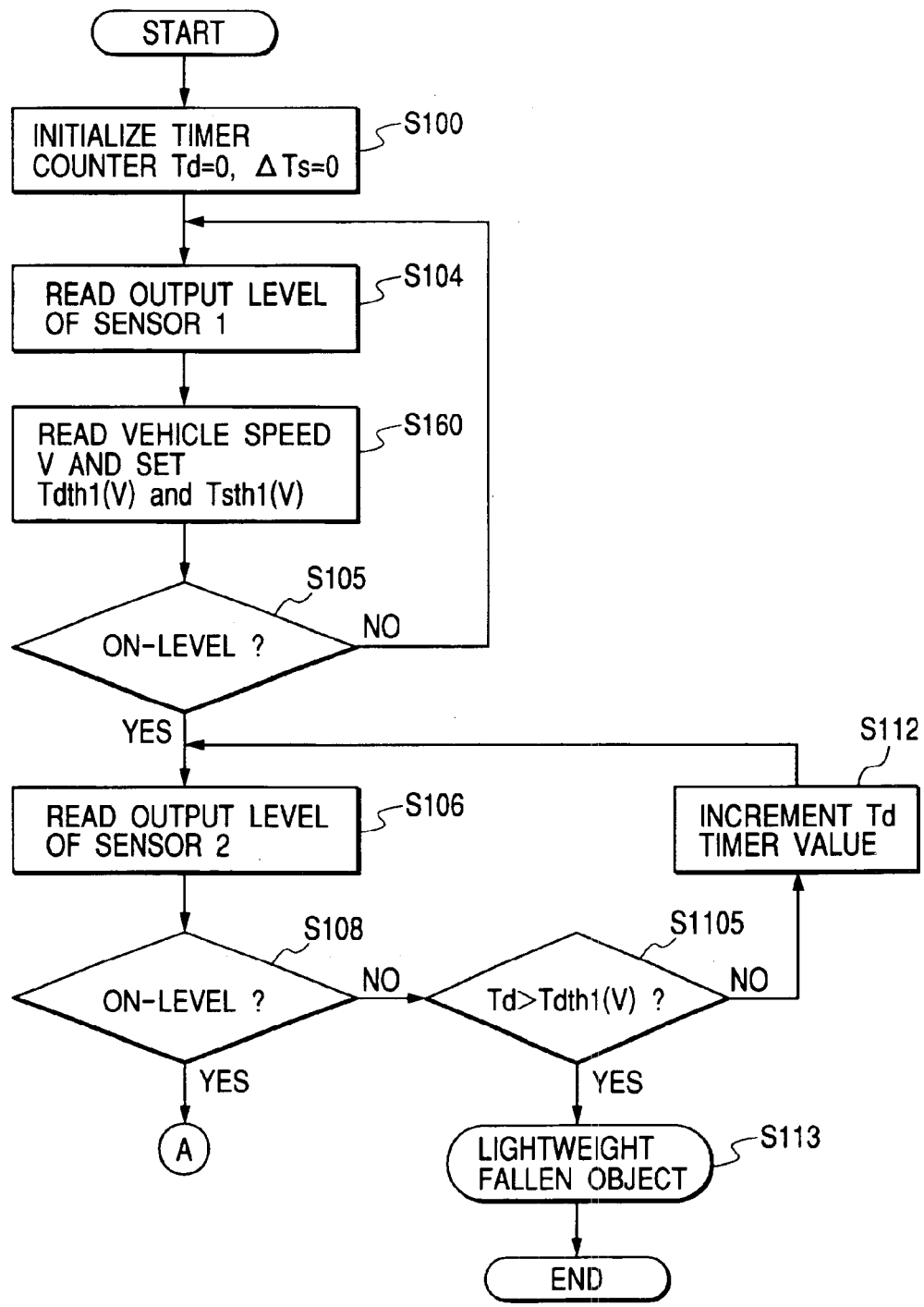
FIG. 17 is a flowchart showing the collision object discriminating processing in accordance with a fifth embodiment of the present invention.
Figure 18:
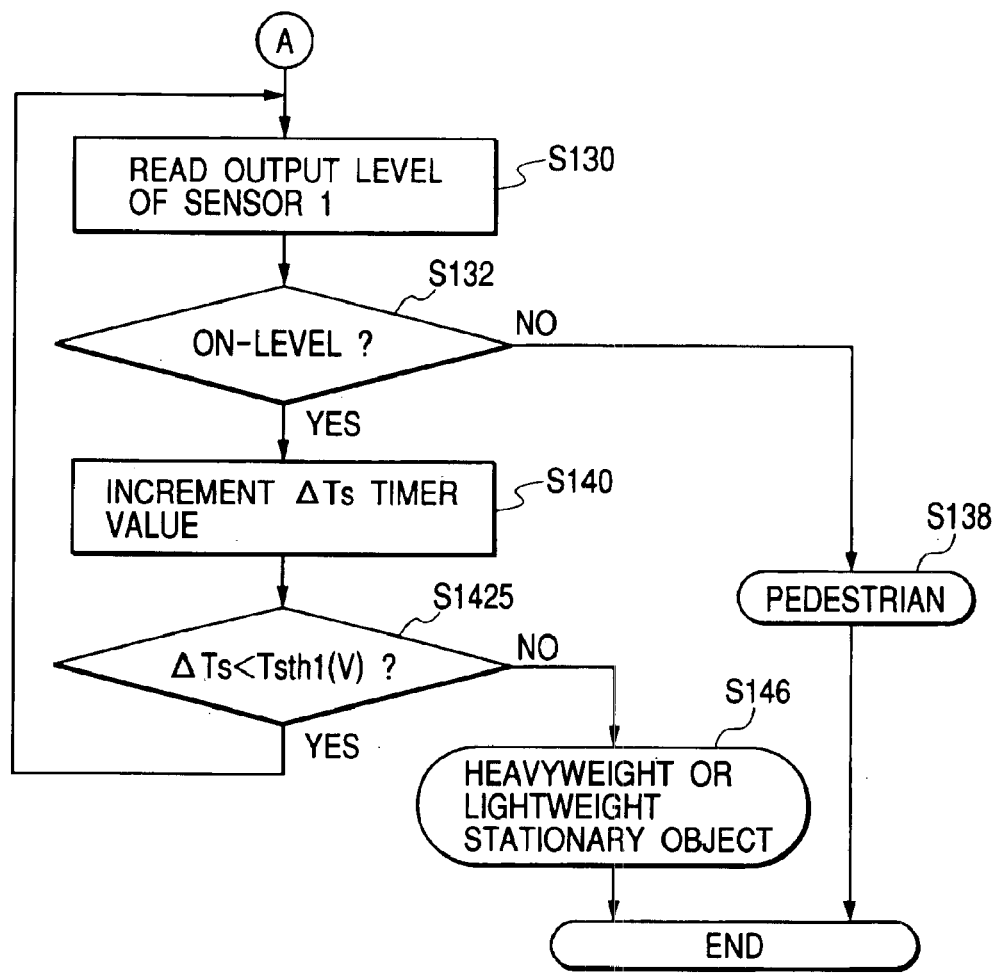
FIG. 18 is a flowchart showing the rest of the collision object discriminating processing in accordance with the fifth embodiment of the present invention.
Figure 19:
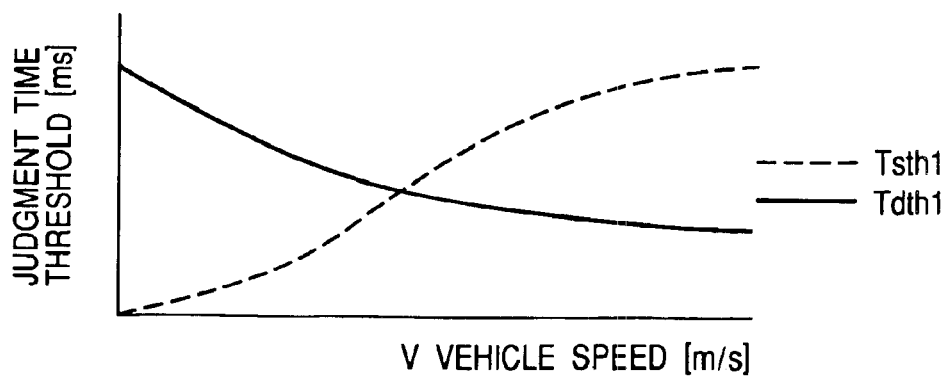
FIG. 19 is a graph showing map characteristics used in the collision object discriminating processing in accordance with the fifth embodiment of the present invention.

This pedestrian discriminating method of this embodiment is different from that of the first embodiment in that the ON duration time threshold or a later-described ON duration time difference threshold is changed in accordance with a signal obtained from a vehicle speed sensor. More specifically, when the vehicle speed is large, the load is correspondingly large and accordingly the ON duration time tends to become long while the later-described ON duration time difference tends to become short. Therefore, it is preferable to increase the ON duration time threshold with increasing vehicle speed to realize accurate judgment. On the other hand, when the vehicle speed is small, the ON duration time threshold is shortened to quickly accomplish the judgment. Thus, the judgment result can be obtained at an early timing. FIGS. 17 and 18 are flowcharts cooperatively showing the pedestrian discriminating processing of the fifth embodiment executed by the controller 4. FIG. 19 is a graph showing the ON duration time threshold and the ON time difference threshold varying in accordance with the vehicle speed. In FIGS. 17 to 19, Tsth1(V) represents a pedestrian ON duration time threshold and Tdth1(V) represents an ON time difference threshold, i.e., a threshold used for judging the length of the ON time difference which is a time lag from the ON-level output by the outside collision detecting sensor 1 to the ON-level output by the inside collision detecting sensor 2.

5.2. Discriminating Method According to Fifth Embodiment

With reference to the flowchart shown in FIGS. 17 and 18, the discriminating method in accordance with the fifth embodiment will be explained. The flowchart shown in FIGS. 17 and 18 includes a new step S160 in which the vehicle speed is read to obtain the ON duration time threshold Tsth1(V) for the outside collision detecting sensor 1 and the ON time difference threshold Tdth1(V) in accordance with the detected vehicle speed with reference to the characteristic data shown in FIG. 19.

After the discriminating processing is started, the ON time difference counting timer and the ON duration time counting timer and are both reset, i.e., Td=0 and ΔTs=0 (at the step S100). An output level of the outside collision detecting sensor 1 is read (at the step S104). Then, a vehicle speed V is read to set the pedestrian ON duration time threshold Tsth1(V) and the ON time difference threshold Tdth1(V) with reference to the graph shown in FIG. 9 (at the step S160). It is then checked whether or not the output level of the sensor 1 exceeds the ON load (at the step S105). When the output level did not exceed the ON load (i.e., NO in the step S105), the processing of steps S104 and S105 is executed again. When the output level exceeded the ON load (i.e., YES in the step S105), an output level of the inside collision detecting sensor 2 is read (S106). Then, it is checked whether or not the output level of the sensor 2 exceeds the ON load (at the step S108). When the output level of the sensor 2 did not exceed the ON load (i.e., NO in the step S108), it is then checked whether or not the ON time difference timer value Td exceeds the ON time difference threshold Tdth1(V) (at the step S1105). When the ON time difference timer value Td did not exceed the ON time difference threshold Tdth1(V) (i.e., NO in the step S1105), the ON time difference timer value Td is incremented (at the step S112) and the control flow returns to the step S106. When the ON time difference timer value Td exceeded the ON time difference threshold Tdth1(V) (i.e., YES in the step S1105), the collision object is identified with the lightweight object (at the step S113) and this routine is terminated.

Next, when the output level of the inside collision detecting sensor 2 exceeds the ON load (i.e., YES in the step S108), the control flow proceeds to the step S130. In other words, when the output level of the inside collision detecting sensor 2 turned into the ON-level before the period of time equal to Tdth1(V) has passed, there is the possibility that the collision object may be a pedestrian.

In the step S130, the output of the outside collision detecting sensor 1 is read again to measure and check the ON duration time of the outside collision detecting sensor. Next, in the step S132, it is checked whether or not the outside collision detecting sensor 1 is in the ON condition. When the outside collision detecting sensor 1 is in the ON condition (i.e., YES in the step S132), the ON duration time timer value ΔTs is incremented (at the step S140). Then, it is checked whether or not the ON duration time timer value ΔTs is less than the pedestrian ON duration time threshold Tsth1(V) (at the step S1425). When the ON duration time timer value ΔTs is less than the pedestrian ON duration time threshold Tsth1(V) (i.e., YES in the step S1425), the control flow returns to the step S130 to repeat the above-described processing. As described above, the stationary object has the longer ON duration time compared with the pedestrian. Thus, when the ON duration time timer value ΔTs is equal to or larger than the pedestrian ON duration time threshold Tsth1(V) (i.e., NO in the step S1425), the collision object is identified with the stationary object (at the step S146) and this routine is terminated.

Meanwhile, in the case of vehicle collision against the pedestrian, the output level of outside collision detecting sensor 1 soon turns into an OFF condition. Thus, when the outside collision detecting sensor 1 turns into the OFF condition (i.e., NO in the step S132), the collision object is identified with the pedestrian (at the step S138). And then, this routine is terminated.

As described above, the ON duration time of the pedestrian is remarkably shorter than that of the stationary object. Thus, in case of vehicle collision against the pedestrian, the outside collision detecting sensor 1 turns into OFF condition before the ON duration time timer value ΔTs reaches the pedestrian ON duration time threshold Tsth1(V). In other words, the control flow repetitively circulates the steps S130, S132, S140, and S142 and finally identifies the collision object with the pedestrian at the step S138.

Thus, according to the vehicle collision object discriminating apparatus in accordance with the fifth embodiment of the present invention, the discriminating section (4) selects, in response to entry of an input signal relating to the vehicle speed (V), the ON duration time threshold (Tsth1(V)) or the ON time difference threshold (Tdth1(V)) preferably applicable to the input signal relating to the vehicle speed with reference to a pre-memorized relationship (FIG. 19) between the vehicle speed and the ON duration time threshold (Tsth1(V)) or the ON time difference threshold (Tdth1(V)).

Sixth Embodiment

Other method for discriminating the pedestrian will be explained hereinafter.

6.1. Discrimination of Pedestrian

As understood from FIG. 3 and FIG. 4, the stationary object and the pedestrian are different from each other in the ON time difference. More specifically, in FIG. 4, it is possible to further increase the ON load. In this case, the ON time difference corresponding to the pedestrian is longer than the ON time difference corresponding to the stationary object. The ON time difference is a period of time from the ON timing of the outside collision detecting sensor 1 (refer to FIG. 3) to the ON timing of the inside collision detecting sensor 2 (refer to FIG. 4). This is believed, in the event of vehicle collision against the pedestrian, high-frequency components of the load are greatly damped and delayed in the bumper. Accordingly, the pedestrian can be discriminated from the stationary object based on the largeness of the ON time difference.

Seventh Embodiment

Other method for discriminating the pedestrian will be explained hereinafter.

7.1. Discrimination of Pedestrian

As understood from FIGS. 5 and 6, both the heavyweight stationary object and the lightweight stationary object are different from the pedestrian in the ON time difference. More specifically, in FIG. 6, the ON load is further reduced so that the inside collision detecting sensor 2 produces an ON-level output each case of the vehicle collision to the pedestrian and the lightweight stationary object. In this case, the ON time difference corresponding to the heavyweight stationary object is shorter than the ON time difference corresponding to the lightweight stationary object or the pedestrian. The ON time difference is a period of time from the ON timing of the outside collision detecting sensor 1 (refer to FIG. 5) to the ON timing of the inside collision detecting sensor 2 (refer to FIG. 6). This is believed, in the event of vehicle collision against the heavyweight stationary object, high-frequency components of the load are less damped in the bumper. Furthermore, the ON time difference of the pedestrian is longer than that of the lightweight stationary object. This is believed, in the event of vehicle collision against the pedestrian, the pedestrian is so jumped or hit away that the load suddenly decreases in waveform (because of high-frequency components contained at a higher percentage). The large attenuation of high-frequency components of the load in the bumper dulls the waveform, and accordingly the ON time difference becomes large. Thus, it becomes possible to promptly identify the type of the collision object based on the ON time difference.

What is claimed is:

1. A vehicle collision object discriminating apparatus comprising:

a front surface side sensor and a reverse surface side sensor which are respectively disposed at front and reverse sides of a cushioning member with respect to a collision direction of a vehicle body for generating an output signal representing an impact force entered when the vehicle body collides with a collision object, and a discriminating section for discriminating the type of the collision object based on output signals of said front and reverse surface sensors, wherein said discriminating section discriminates the type of said collision object based on an ON duration time or an ON time difference as well as a combination of output levels of said two sensors, said ON duration time representing a period of time during which at least one of said two sensors continuously produces an ON-level output, said ON time difference representing a period of time from ON-level output by one of said two sensors to ON-level output by the other of said two sensos.

2. The vehicle collision object discriminating apparatus in accordance with claim 1, wherein said front and reverse surface side sensors are binary sensors each outputting a binary signal with reference to a predetermined threshold.

3. The vehicle collision object discriminating apparatus in accordance with claim 1, wherein said front surface side sensor is fixed on a front surface of said cushioning member and said reverse surface side sensor is fixed on a reverse surface of said cushioning member.

4. The vehicle collision object discriminating apparatus in accordance with claim 1, wherein said discriminating section identifies said collision object with a pedestrian when said ON duration time is shorter than a predetermined ON duration time threshold and when said reverse surface side sensor produces an ON-level output within a predetermined time after said front surface side sensor has produced an ON-level output under a condition that said front surface side sensor continuously produces the ON-level output.

5. The vehicle collision object discriminating apparatus in accordance with claim 1, wherein said discriminating section identifies said collision object with a pedestrian when the ON time difference is longer than a predetermined ON time difference threshold, said ON time difference representing a period of time from ON-level output by said front surface side sensor to ON-level output by said reverse surface side sensor.

6. The vehicle collision object discriminating apparatus in accordance with claim 1, wherein said discriminating section identifies said collision object with a pedestrian when said ON duration time is shorter than a predetermined ON duration time threshold and when said reverse surface side sensor does not produce an ON-level output within a predetermined time after said front surface side sensor has produced an ON-level output under a condition that said front surface side sensor continuously produces the ON-level output.

7. The vehicle collision object discriminating apparatus in accordance with claim 1, said discriminating section identifies said collision object with a pedestrian when the ON duration time of said front surface side sensor is in a predetermined range between a first ON duration time threshold and a second ON duration time threshold and also when said reverse surface side sensor does not produces an ON-level output within a predetermined time after said front surface side sensor has produced an ON-level output under a condition that said front surface side sensor continuously produces the ON-level output.

8. The vehicle collision object discriminating apparatus in accordance with claim 1, wherein said discriminating section selects, in response to entry of an input signal relating to a vehicle speed, an ON duration time threshold or an ON time difference threshold preferably applicable to said input signal relating to said vehicle speed with reference to a pre-memorized relationship between the vehicle speed and said ON duration time threshold or said ON time difference threshold.

* * * * *